US010189033B2

(12) United States Patent
Sparkes et al.

(10) Patent No.: US 10,189,033 B2
(45) Date of Patent: Jan. 29, 2019

(54) DEPOSITION OF COATINGS ON SUBSTRATES

(71) Applicant: Laser Fusion Technologies Ltd, Windsor (GB)

(72) Inventors: Martin Sparkes, Shingay Cum Wendy (GB); William O'Neill, Cambridge (GB); Andrew Cockburn, Cambridge (GB); Rocco Lupoi, Dublin (IE); Matthew Bray, Ulverston (GB)

(73) Assignee: Laser Fusion Technologies Ltd., Windsor (GB)

( * ) Notice: Subject to any disclaimer, the term of this patent is extended or adjusted under 35 U.S.C. 154(b) by 340 days.

(21) Appl. No.: 14/350,714

(22) PCT Filed: Oct. 26, 2012

(86) PCT No.: PCT/GB2012/052679
§ 371 (c)(1),
(2) Date: Apr. 9, 2014

(87) PCT Pub. No.: WO2013/061086
PCT Pub. Date: May 2, 2013

(65) Prior Publication Data
US 2014/0234551 A1 Aug. 21, 2014

Related U.S. Application Data

(60) Provisional application No. 61/593,039, filed on Jan. 31, 2012.

(30) Foreign Application Priority Data

Oct. 28, 2011 (GB) .................................. 1118698.8

(51) Int. Cl.
B05B 3/00 (2006.01)
C23C 24/04 (2006.01)
(Continued)

(52) U.S. Cl.
CPC ............ B05B 3/001 (2013.01); B23K 26/034 (2013.01); B23K 26/083 (2013.01);
(Continued)

(58) Field of Classification Search
CPC ......... C23C 20/00; C23C 24/00; B23K 26/00; B23K 2203/00; B05B 3/00; B05D 1/00
(Continued)

(56) References Cited

U.S. PATENT DOCUMENTS 4,269,868 A 5/1981 Livsey
4,810,525 A 3/1989 Morita
(Continued)

FOREIGN PATENT DOCUMENTS

EP 2206803 A1 7/2010
GB 2439934 1/2008
(Continued)

OTHER PUBLICATIONS

"Influence of process conditions in laser-assisted low-pressure cold spraying", M. Kulmala, P. Vuoristo, Surface and Coatings Technology, vol. 202, Issue 18, 2008, pp. 4503-4508.*
(Continued)

Primary Examiner — Gordon Baldwin
Assistant Examiner — Mohammad Mayy
(74) Attorney, Agent, or Firm — Adsero IP

(57) ABSTRACT

A process and apparatus are disclosed for the deposition of a layer of a first material onto a substrate of a second material. Powder particles of the first material are entrained into a carrier gas flow to form a powder beam directed to impinge on the substrate. This defines a powder beam footprint region at the substrate. The powder beam and the substrate are moved relative to each other to move the powder beam footprint relative to the substrate, thereby to deposit the layer of the first material. A laser is operated to
(Continued)

cause direct, local heating of at least one of a forward substrate region and a powder beam footprint region. The laser beam direction is defined with reference to a plane coincident with or tangential to a surface of the substrate at the center of the laser beam footprint in terms of an elevation angle from the plane to the laser beam direction and in terms of an acute azimuthal angle from the movement direction to the laser beam direction. The elevation angle is 80° or less and the azimuthal angle is ±60° or less. In the apparatus, there are provided at least three laser sources arrayed around the powder beam footprint, the angular spacing between the laser sources being 120° or less.

14 Claims, 21 Drawing Sheets

(51) Int. Cl.
| | |
|---|---|
| *B23K 26/03* | (2006.01) |
| *B23K 26/08* | (2014.01) |
| *B23K 26/342* | (2014.01) |
| *B23K 101/06* | (2006.01) |
| *B23K 103/04* | (2006.01) |
| *B23K 103/24* | (2006.01) |

(52) U.S. Cl.
CPC ........ *B23K 26/0823* (2013.01); *B23K 26/342* (2015.10); *C23C 24/04* (2013.01); *B23K 2101/06* (2018.08); *B23K 2103/04* (2018.08); *B23K 2103/24* (2018.08)

(58) Field of Classification Search
USPC .................................. 419/8; 427/554; 118/8
See application file for complete search history.

(56) References Cited

U.S. PATENT DOCUMENTS

| | | | | |
|---|---|---|---|---|
| 5,912,057 | A * | 6/1999 | Nishimura | B23K 26/34 427/554 |
| 6,203,861 | B1 * | 3/2001 | Kar | B22F 3/1055 264/497 |
| 2006/0133947 | A1 * | 6/2006 | DeBiccari | B23K 26/0066 419/8 |
| 2010/0068410 | A1 | 3/2010 | Jensen | |
| 2011/0147205 | A1 * | 6/2011 | Guay | B01J 23/8906 204/290.12 |

FOREIGN PATENT DOCUMENTS

| | | |
|---|---|---|
| WO | WO-1995-31584 A1 | 11/1995 |
| WO | WO 2011/069101 A2 | 6/2011 |
| WO | WO 2013/061085 | 5/2013 |
| WO | WO 2013/061086 | 5/2013 |

OTHER PUBLICATIONS

"Modeling the Influence of Process Parameters and Additional Heat Sources on Residual Stresses in Laser Cladding", F. Bruckner, D. Lepski, and E. Beyer, Journal of Thermal Spray Technology, vol. 16(3) Sep. 2007, pp. 355-373.*

"Cold-Spraying Coupled to Nano-Pulsed Nd-YaG Laser Surface Pre-treatment" D.K. Christoulis, S. Guetta, E. Irissou, V. Guipont, M.H. Berger, M. Jeandin, J.-G. Legoux, C. Moreau, S. Costil, M. Boustie, Y. Ichikawa, and K. Ogawa, Journal of Thermal Spray Technology, vol. 19(5) Sep. 2010, pp. 1062-1073.*

Bray et al., (2009) Surface & Coatings Technology 203:2851-2857, "The Laser-assisted Cold Spray process and deposit characterization".

Christoulis et al., (2010) Journal of Thermal Spray Technology 19(5):1062-1073, "Cold-Spraying Coupled to Nano-Pulsed Nd-YaG Laser Surface Pre-treatment".

Irissou et al., (2008) Journal of Thermal Spray Technology 17(4):495-516, "Review on Cold Spray Process and Technology: Part 1—Intellectual Property".

Jonsson and Hogmark (1984) Thin Solid Films 114:257-269, "Hardness Measurements of Thin Films".

Kulmala and Vuoristo (2008) Surface and Coatings Technology, 202(18):4503-4508, "Influence of process conditions in laser-assisted low-pressure cold spraying".

Tabor (1970) Review of Physics in Technology, "The hardness of solids", pp. 145-179.

International Search Report dated Jan. 23, 2013 for PCT/GB2012/052678.

International Search Report dated Jan. 23, 2013 for PCT/GB2012/052679.

EPO Examination Report dated Aug. 28, 2018; (EP12791231.9), 8 pages.

Majumdar et al., "A Green's function model for the analysis of laser heating of materials", Science Direct, Applied Mathematical Modelling (227), 15 pages.

* cited by examiner

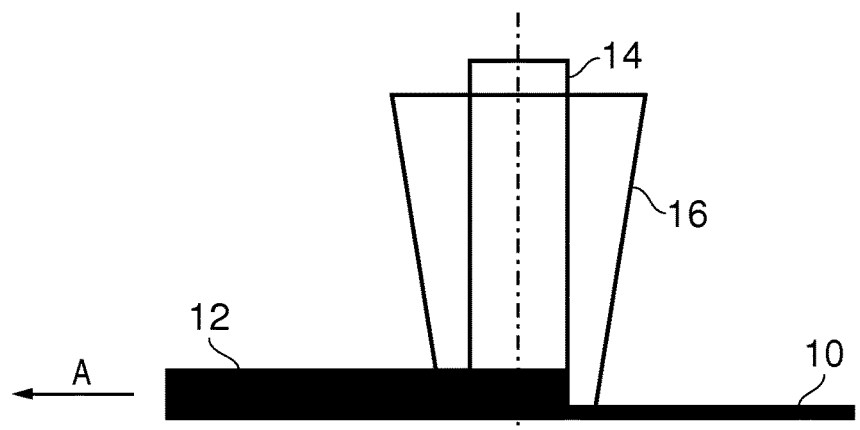
FIG. 1
FIG. 1A
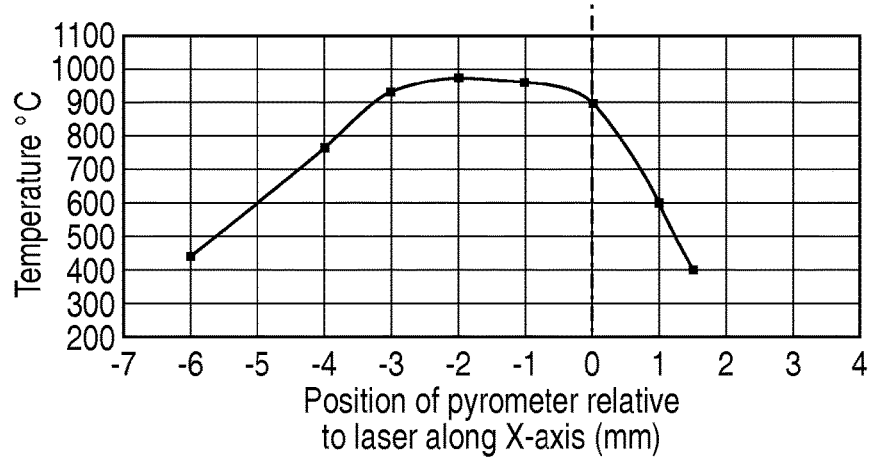
FIG. 2

DEPOSITION OF COATINGS ON SUBSTRATES

RELATED APPLICATIONS

This application is a 35 U.S.C. § 371 national phase application of PCT/GB2012/052679 (WO 2013/061086), filed on Oct. 26, 2012, entitled "Deposition of Coatings on Substrates", which application claims the benefit of U.S. Provisional Application Ser. No. 61/593,039, filed Jan. 31, 2012 which is incorporated herein by reference in its entirety, and Great Britain Patent Application No. 1118698.8 filed Oct. 28, 2011, which is incorporated herein by reference in its entirety.

BACKGROUND TO THE INVENTION

Field of the Invention

The present invention relates to processes for the deposition of coatings on substrates, to apparatus for carrying out such processes and to products manufactured using such processes. The invention has particular, but not necessarily exclusive, application to modifications of known cold gas dynamic spraying processes.

Related Art

Cold gas dynamic spraying (typically known as "cold spraying" and referred to as such in the remainder of this specification) is a known process involving the entrainment of powder particles of a first material in a fast flowing stream of gas (typically a non-oxidising gas) and allowing the particles to impinge on a substrate formed of a second material. In this specification, the flowing powder particles are referred to as a "powder beam". Under suitable conditions, the particles from the powder beam adhere to the substrate to form a coating layer on the substrate. The particles adhere to the substrate through plastic deformation and bonding. It is to be noted that neither the particles nor the substrate melt in this process (although some nanoscale local melting may be allowed). This is advantageous for many materials, since macroscopic melting can deleteriously affect the materials properties of the coating and/or the substrate.

In US 2006/0133947, a cold spraying process is modified by the use of a laser to provide heating. The intention in US 2006/0133947 is to improve the density of the coating. The powder particles have a diameter in the range 5-50 µm. Larger particle sizes typically cannot be accelerated to suitable speeds. Smaller particle sizes, whilst able to be accelerated to high speeds, tend to be swept away from the surface of the substrate due to a bow shock layer above the surface. The particles are accelerated to speeds in the range 850-1200 m/s. The preferred carrier gas in US 2006/0133947 is helium, because it allows the highest speeds to be obtained of any suitable gas. A laser is used to provide heating to increase the density of the coating after deposition. The laser may be moved with respect to the substrate, behind the powder beam applied to the substrate, in order to provide in situ heat treatment to the coating soon after the coating is deposited. There is no disclosure in US 2006/0133947 of heating the substrate directly using the laser.

GB-A-2439934 discloses a cold spray process in which it is intended to heat the powder particles in the gas stream. This is said to be achieved by both heating the gas and by directing a laser along the powder beam. The present inventors consider that it is doubtful that the powder particles are heated to a significant extent using the laser, considering the very short typical time of flight of the powder particles in view of the very high speeds required for cold spraying. However, GB-A-2439934 also discloses that the laser heats the substrate at the point at which the powder particles impact the substrate, giving rise to the effect of improved bonding between the powder particles and the substrate. There is no discussion in GB-A-2439934 of the power distribution of the laser beam.

US 2010/0068410 discloses a cold spray process in which a laser is directed to coincide with the point of impact of the particle beam, to provide local heating at that point. The stated aim of US 2010/0068410 is to manage the energy of the particles, so that they arrive at the substrate with just enough energy to adhere to the substrate and are then heated by the laser to fuse with the substrate. US 2010/0068410 also suggests that heating of the gas stream may be advantageous, in order to reduce the power requirements of the laser.

Christoulis et al (2010) [D. K. Christoulis, S. Guetta, E. Irissou, V. Guipont, M. H. Berger, M. Jeandin, J.-G. Legoux, C. Moreau, S. Costil, M. Boustie, Y. Ichikawa and K. Ogawa "Cold-Spraying Coupled to Nano-Pulsed Nd-YaG Laser Surface Pre-treatment" Journal of Thermal Spray Technology, Volume 19, Number 5, 1062-1073, 2010] disclose work on cold spraying of Al powder onto Al substrates. The carrier gas was nitrogen and the inlet gas temperature was 350° C. The Al substrates were subjected to laser ablation treatment using two Q-switched Nd-YAG lasers operating at a wavelength of 1.064 µm with an average power output of 40 W each (270 mJ per pulse with an adjustable frequency up to 150 Hz) and a pulse duration of about 10 ns. The laser beam was directed to the substrate so that the laser beam passed over the substrate milliseconds prior to the cold spray jet of particles.

Kulmala and Vuoristo (2008) [M. Kulmala and P. Vuoristo "Influence of process conditions in laser-assisted low-pressure cold spraying" Surface and Coatings Technology, Volume 202, Issue 18, 15 Jun. 2008, Pages 4503-4508] disclose cold spraying processes in which copper and nickel powders were sprayed with additions of alumina powder onto carbon steel substrates. The carrier gas was air, heated to 445° C. for copper and 650° C. for nickel. A 6 kW continuous wave laser was directed to heat the location at which the powder beam reached the substrate surface. The process described by this document is a low pressure process (gas pressure 6 bar). Incorporation of ceramic particles (alumina powder) into the powder beam assists in compaction of the deposited layer by mechanical means. The use of air as the carrier gas tends to cause at least partial oxidation of particles in the powder beam, further reducing the quality of the deposited layer.

SUMMARY OF THE INVENTION

The present inventors consider that the effect of the laser treatment in Christoulis et al (2010) is to clean the Al surface before powder deposition, by at least partially removing the native oxide film on the Al surface. It is considered by the inventors that any heating of the substrate at significant depths from the surface of the substrate is negligible.

The present inventors further consider that the process used in Kulmala and Vuoristo (2008) would tend to lead to relatively low quality deposited layers, due to the low energy of the powder beam and due to the requirement for the incorporation of ceramic particles in the powder beam.

The present inventors have realised that further improvements of cold spraying processes may be possible. In particular, it would be advantageous to reduce the process costs whilst ensuring high quality deposited layers. Although using helium gas is technically advantageous for the gas stream, since it can achieve very high speeds, it is not preferred, since it is very expensive and becoming more scarce. It is prohibitively expensive for typical industrial scale coating applications. It would be much preferred to be able to carry out a suitable cold spraying process using a different, more abundant gas, such as nitrogen. More preferably in some circumstances would be the ability to carry out cold spraying using air.

These other gases cannot attain such high speeds as helium, but are much more attractive to industrial application of cold spraying in view of cost.

From a technical perspective, the use of a gas other than helium as the carrier gas means that the kinetic energy capable of being provided to the powder particles is lower. Therefore the present inventors have considered how these relatively low kinetic energy levels can be best utilised in order to provide an industrial scale cold spray deposition process. The present inventors have considered whether it would be acceptable simply to pre-heat the particles in order that the particles in the powder beam will adhere more successfully to the substrate. The carrier gas may also be heated if needed. Although such an arrangement is technically feasible, the power requirements for this are considered to be unacceptably high. It is at present considered that too much heat energy is wasted in this process to make it industrially viable. Furthermore, although pre-heating the particles can provide a technical advantage, this approach is limited because if the particles are pre-heated to a temperature which is too high, the particles tend to stick to the nozzle through which they are sprayed. It is effectively impossible to heat the particles in-flight in order to avoid this problem, due to the speed of travel of the particles.

The present inventors have therefore devised the present invention, which aims to address one or more of the disadvantages outlined above. Preferably, the present invention reduces, ameliorates, avoids or even overcomes one or more of these disadvantages.

Accordingly, in a first aspect, the present invention provides a coating process for the deposition of a layer of a first material onto a substrate of a second material, the second material optionally being different from the first material, the process including the steps:
 entraining powder particles of the first material into a carrier gas flow to form a powder beam directed to impinge on the substrate, thereby defining a powder beam footprint region at the substrate; and
 causing relative movement of the powder beam and the substrate to move the powder beam footprint relative to the substrate to deposit the layer of the first material;
wherein, with reference to the relative movement between the powder beam footprint and the substrate, there is defined a forward substrate region forwards of the powder beam footprint region,
the process further including the steps:
 operating a heating means to cause direct, local heating of at least one of the forward substrate region and the powder beam footprint region; and
 controlling the heating means and the relative movement of the powder beam and the substrate to provide a spatial temperature distribution at the powder footprint region of the substrate in which the local temperature of the substrate is in the range 0.5 Ts to less than Ts in a volume from the surface of the substrate at least up to a depth of 0.2 mm from the surface of the substrate and not more than 0.25 Ts at a depth of 1 mm from the surface of the substrate,
wherein Ts is the solidus temperature (in K) of the second material.

In a second aspect, the present invention provides an apparatus for the deposition of a layer of a first material onto a substrate of a second material, the second material optionally being different from the first material, the apparatus including:
 a powder beam formation device capable of entraining powder particles of a first material into a carrier gas flow to form a powder beam directed to impinge on the substrate, thereby defining a powder beam footprint region at the substrate; and
 means for causing relative movement of the powder beam and the substrate to move the powder beam footprint relative to the substrate to deposit the layer of the first material;
wherein, with reference to the relative movement between the powder beam footprint and the substrate, there is defined a forward substrate region forwards of the powder beam footprint region,
the apparatus further including:
 a heating means operable to cause direct, local heating of at least one of the forward substrate region and the powder beam footprint region; and
 control means operable to control the heating means and the relative movement of the powder beam and the substrate to provide a spatial temperature distribution at the powder footprint region of the substrate in which the local temperature of the substrate is in the range 0.5 Ts to less than Ts in a volume from the surface of the substrate at least up to a depth of 0.2 mm from the surface of the substrate and not
 more than 0.25 Ts at a depth of 1 mm from the surface of the substrate,
wherein Ts is the solidus temperature (in K) of the second material.

The first and/or second aspect of the invention may have any one or, to the extent that they are compatible, any combination of the following optional features.

In this way, the present invention allows the particles in the powder beam to adhere in an improved manner to the substrate, at least in part because the control of the temperature distribution in the powder footprint region of the substrate allows suitable control of the yield stress and/or resilience of the second material, but without waste of too much heat deep into the substrate where the heat has no beneficial effect on the formation of the layer.

Preferably, or alternatively to the first or second aspect of the invention, the spatial temperature distribution at the powder footprint region of the substrate is controlled so that the local temperature of the substrate is in the range 0.5 Ts to less than Ts in a volume from the surface of the substrate at least up to a first depth from the surface of the substrate and not more than 0.25 Ts at a second, greater, depth from the surface of the substrate. The first depth is preferably at least 10 times the average particle radius of the powder particles. The particle size distribution of the powder particles can be determined using laser diffraction in a known manner and the average particle diameter (and therefore radius) determined from the particle size distribution. A suitable instrument for measuring the particle size distribution is the Mastersizer 2000 from Malvern Instruments. The second depth is typically 1 mm from the surface of the substrate. Alternatively, the second depth may be at least 40 times the average particle radius of the powder particles.

Preferably, the average particle diameter of the powder particles (based on the total volume of the particles) is greater than 5 µm, more preferably greater than 10 µm, still more preferably greater than 20 µm. Preferably, the average particle diameter of the powder particles is not greater than 100 µm, more preferably not greater than 80 µm, still more preferably not greater than 60 µm. Typically the average particle diameter may be about 50 µm. The particle size distribution is typically a normal distribution. Preferably 90% or more by volume (more preferably 95% or more, or 99% or more) of the particles in the powder beam have a particle diameter within plus or minus 20 µm of the average particle diameter.

The particle size and the distribution is relevant because large particles cannot be accelerated to high enough speeds to adhere to the substrate. Smaller particles cannot penetrate the bow shock above the substrate.

The choice of a temperature profile linked to a depth of the substrate of 10 times the particle radius arises due to the inventors' insight that the impact of an arriving particle can be considered to be similar to an indentation hardness test. In theories relating to indentation hardness, in particular for Brinell hardness (where the indentor has a spherical profile), it is considered that when the substrate has a depth of 10 or more times the indent depth, the substrate is thick enough that the hardness value obtained is not significantly affected by the substrate being too thin. This is explained in D. Tabor, Review of Physics in Technology 1 145 (1970) and Jonsson and Hogmark, Thin Solid Films, 114 (1984) 257-269.

The powder particles in the powder beam may be considered to have average kinetic energy $E_k$ ($E_k$ optionally varying with position). $E_k$ is preferably selected so that without direct heating of the forward substrate region and/or the powder footprint region, the powder particles would not adhere to the substrate. This arrangement is preferred if it is required to control the adherence of the particles to the surface by suitable control of the heating means. This is discussed in more detail below. The use of heating to promote adherence of the powder particles also allows the deposition efficiency (DE) to be increased. In the context of cold spraying (or laser assisted cold spraying in the preferred embodiment), DE is defined as the mass of the coating divided by the mass of the powder sprayed to form the coating. It is therefore a measure of the efficiency with which the powder particles in the powder beam are used in the formation of a deposited coating.

It is typical for the powder beam to have a distribution of $E_k$ that varies with position at the powder beam footprint. For example, the distribution may be Gaussian or near-Gaussian. Then, considering a first region and a second region of the powder beam footprint, $E_k$ in the second region may be lower than that in the first region. For example, the first region may be closer to the centre of the powder beam than the second region. Preferably, where there is such variation in $E_k$ with position across the powder beam, the heating means is controlled so that the temperature distribution in the powder beam footprint region is such that the temperature in the second region is higher than the temperature in the first region. This allows the yield stress in the second region to be lower than the yield stress in the first region.

More generally, where there is variation with $E_k$ with position across the powder beam, there is preferably corresponding control of the heating means so that the heating of the forward substrate region and/or the powder beam footprint region is tailored to at least partially compensate for the variation in $E_k$ with position across the powder beam.

In this way, the effect of the variation of $E_k$ with position in the powder beam is compensated by spatial control of the yield stress at the powder footprint region. This allows the adherence and the uniformity of adherence of the particles to be improved across the powder beam footprint region.

In a similar way, and in some cases with a greater effect, there can be variation in the material type and/or materials properties across the powder beam footprint. This is particularly the case for the first coating layer deposited on the substrate, where typically the material of the substrate may have a relatively smooth surface finish and therefore a low absorption of laser light, whereas the material of the deposited coating typically has a rough surface and a high absorption of laser light. These differences across the powder beam footprint can be (at least partially) compensated for by spatial control of the heating means.

With reference to the relative movement between the powder beam footprint and the substrate, there is defined a rearwards deposited layer region, rearwards of the powder beam footprint region. In some embodiments, the rearwards deposited layer region may also be heated. This is preferably carried out in order to densify the deposited layer and/or to relieve residual stress in the deposited layer. The heating may be carried out with a separate heating means. However, preferably, the heating of the rearwards deposited layer region is direct heating by the same heating means which also heats the forward substrate region and/or the powder footprint region, the heating means being controlled appropriately to achieve direct heating of the rearwards deposited layer region.

The present invention includes the situation where a single layer of the first material is deposited on a substrate of a second material. The substrate may, for example, be a ferrous substrate, e.g. a steel substrate. In that case, the first material typically has a different composition to the second material. The first material may be any material which can be coated onto the substrate using the deposition techniques of the present invention. For example, an anti-corrosion coating or a wear coating may be applied.

However, in some embodiments of the invention, multiple layers may be applied. These layers are typically applied sequentially. In that case, the previously-deposited layer is acting as the substrate for the layer being applied. However, the principle of the invention holds in this situation—it is still preferred that the previously-deposited layer is heated in order to control its yield stress and to ensure that the new layer adheres properly and uniformly.

Typically, the previously-deposited layer has different properties to the original substrate, in terms of absorption of infra red radiation in particular, but also in terms of thermal diffusivity, specific heat capacity and yield stress variation with temperature. Therefore, in general, the heating of the previously-deposited layer should be controlled differently to the heating of the original substrate.

Multiple layers may be applied in this way in order to achieve a relatively thick coating of substantially uniform composition. In that case, for layers subsequent to the first layer, the layers are being applied to previously-deposited layers, and a similar heating strategy can be employed for each of these subsequent layers.

However, in some embodiments, one or more of the multiple layers may have a different composition to one or more other layers. This can be done in order to form a compositionally layered structure. In that case, each layer may require a different heating strategy to the other layers.

Preferably, the heating means is a laser. Suitable high power lasers are well known and readily available. Using a laser as the heating means readily allows spatial and volumetric control of the temperature profile of the substrate. Where a laser is used, the process of the preferred embodiments of the invention may be referred to as "laser-assisted cold spraying".

In a first configuration, suitable control of the heating of the substrate is achieved using an optical element. The optical element provides a laser intensity profile at the substrate which provides the required temperature profile in the volume of the substrate below the powder beam footprint. The optical element may operate by one or more of reflection, refraction or diffraction. A spatially complex laser intensity profile can be formed using such an optical element. The use of such an optical element is efficient and convenient. However, it is typically limited to the situation where the required intensity profile is temporally constant (i.e. does not change with time).

In a second configuration, suitable control of the heating of the substrate may be achieved by scanning the laser beam over the required area of the forward substrate region, the powder beam footprint region and/or the rearwards deposited layer region. This is typically achieved by control of a movable reflective optical element. Scanning the laser beam in this way allows precise control of the average laser intensity profile delivered to the substrate. It also provides the advantage of allowing temporal control of the average laser intensity profile. Thus, the laser intensity profile can be easily controlled and changed based on changes in conditions at the substrate, e.g. for depositing subsequent layers on previously-deposited layers.

In some embodiments, it is preferred for the heating means directly to heat the forward substrate region but not the powder beam footprint region. Offsetting the direct heating forwardly of the powder beam allows the heating to be more carefully controlled and avoids interference by the incoming powder particles. This offsetting also typically allows higher heating intensities to be used in heating the substrate, thus reducing the yield stress at the substrate more quickly and therefore making the deposition process more efficient. For many materials combinations, applying the same high heating intensity at the powder beam footprint region would not be effective, because the high heating power might risk burn-off of the incident powder. In modified embodiments, it is preferred for the heating means directly to heat the forward substrate region using a first intensity profile and to heat at least part of the powder beam footprint region using a second intensity profile, wherein the average intensity of the first intensity profile is greater than the average intensity of the second intensity profile.

Where the heating means is a laser, preferably the laser light reaches the substrate in a direction which is non-parallel (and non-coaxial) to the powder beam. This allows the laser light to be directed towards the substrate in a manner that provides a suitable temperature distribution in the substrate without significantly overlapping with the powder beam. Further details about the relative orientation of the substrate, the substrate movement direction, the powder beam and the laser direction are set out further below.

Preferably, the carrier gas is not heated. If the carrier gas is heated, in some embodiments it is heated to not more than 400° C. In other embodiments, the carrier gas may be heated to higher temperatures, e.g. up to 1000° C., in order to improve deposition characteristics for certain materials combinations.

Preferably, the solidus temperature Ts (in K) of the substrate is at least 1175K. More preferably, the solidus temperature Ts (in K) of the substrate is at least 1300K.

Preferably, when the heating means is not activated, Ek of the powder beam is selected so that the powder particles do not adhere to the substrate. This allows the heating means to be the controlling factor in whether or not a deposited layer is formed. Suitable control of the heating means with a constant powder beam flow therefore allows precise patterning of the formation of the deposited layer on the substrate. For example, if the maximum flow speed of the powder beam is up to 400 m·s$^{-1}$, suitable patterning control can be achieved. In some embodiments, control of the heating means can be much more precise than control of the powder beam, in terms of position and/or dimensions.

The present inventors have realised that this constitutes an independent aspect of the present invention.

Accordingly, in a third aspect, the present invention provides a coating process for the deposition of a layer of a first material onto a substrate of a second material, the second material optionally being different from the first material, the process including the steps:

entraining powder particles of the first material into a carrier gas flow to form a powder beam directed to impinge on the substrate, thereby defining a powder beam footprint region at the substrate; and causing relative movement of the powder beam and the substrate to move the powder beam footprint relative to the substrate to deposit the layer of the first material;

wherein, with reference to the relative movement between the powder beam footprint and the substrate, there is defined a forward substrate region forwards of the powder beam footprint region, the process further including the steps:

causing the energy Ek of the powder beam to be such that when the heating means is not activated, the powder particles do not adhere to the substrate;

selectively operating a heating means to cause direct, local heating of at least one of the forward substrate region and the powder beam footprint region, so that the shape and location of the deposited layer is based on operation of the heating means.

Thus, the process has additional controllability when compared to more conventional cold spraying. Where the heating means is a laser, very precise patterning of the deposited layer is possible because the laser beam can be controlled exceptionally tightly both in terms of spatial location and in terms of switching on and off. Furthermore, due to the control of the spatial temperature profile of the substrate using the laser, it is possible to heat only a very narrow track on the substrate, meaning that particles will adhere only at the narrow track. In this way, it is possible to deposit layers with a width that is smaller than the width of the powder beam, corresponding instead to the width of the track of the substrate heated to a suitable temperature.

In a fourth aspect, the present invention provides an apparatus for the deposition of a layer of a first material onto a substrate of a second material, the second material optionally being different from the first material, the apparatus including:

a powder beam formation device capable of entraining powder particles of a first material into a carrier gas flow to form a powder beam directed to impinge on the substrate, thereby defining a powder beam footprint region at the substrate; and means for causing relative movement of the powder beam and the substrate to move the powder beam footprint relative to the substrate to deposit the layer of the first material;

wherein, with reference to the relative movement between the powder beam footprint and the substrate, there is defined a forward substrate region forwards of the powder beam footprint region, the apparatus further including:
a heating means operable to cause direct, local heating of at least one of the forward substrate region and the powder beam footprint region; and
control means operable to control the heating means, wherein the apparatus is operable so that the energy Ek of the powder beam is such that when the heating means is not activated, the powder particles do not adhere to the substrate, selective operation of the heating means determining the shape and location of the deposited layer.

Typically, the deposited layer is at least 0.1 mm thick. Greater thickness is possible, for example at least 1 mm thick, or at least 2 mm thick. Coatings of up to about 4 mm thickness are possible. Thick coatings can be built up as a series of layers. This can help to reduce the build up of stress in the coating.

Applicable to any aspect of the invention is that fact that suitable control of the heating means may allow only a very narrow track of the substrate to be heated to the required temperature profile. This is particularly applicable where the heating means is a laser. In this way, it is possible to form a coating whose lateral width is smaller than the diameter of the powder beam.

The inventors have also realised that the formation of a layer of the first material on the substrate of the second material, combined with relative movement of the powder beam and the substrate, means that special attention should be paid to the profile of the growing layer of the first material. This is because the profile of the growing affects the absorption of energy from the laser source. In some circumstances, the profile of the growing layer can shadow parts of the growing layer from the laser source. This can disadvantageously lead to asymmetric and reduced deposition efficiency.

Accordingly, in a fifth aspect, the present invention provides a coating process for the deposition of a layer of a first material onto a substrate of a second material, the second material optionally being different from the first material, the process including the steps:
entraining powder particles of the first material into a carrier gas flow to form a powder beam directed to impinge on the substrate, thereby defining a powder beam footprint region at the substrate;
causing relative movement of the powder beam and the substrate in a movement direction to move the powder beam footprint relative to the substrate to deposit the layer of the first material; and
operating a laser source to direct a laser beam along a laser beam direction to provide a laser beam footprint to cause direct, local heating of at least one of the forward substrate region and the powder beam footprint region,
the laser beam direction being defined with reference to a plane coincident with or tangential to a surface of the substrate at the centre of the laser beam footprint in terms of an elevation angle from the plane to the laser beam direction and in terms of an acute azimuthal angle from the movement direction to the laser beam direction, wherein the elevation angle is 80° or less and the azimuthal angle is ±60° or less.

As will be understood, it is for practical reasons not preferred for the laser beam direction to be parallel to and particularly not coaxial with the powder beam. Therefore typically the laser beam must be directed to the substrate from a different direction. However, if the angle of elevation of the laser beam (as defined above) is relatively low, then the growing layer of the first material at the substrate may shadow parts of that growing layer from heating by the laser. The present inventors have found that provided the laser beam is directed at an acute azimuthal angle of 60° or less to the movement direction, this shadowing effect can be advantageously reduced.

In some embodiments, it is preferred for the elevation angle to be 75° or less, 70° or less, 65° or less or 60° or less. Preferably the elevation angle is 30° or more.

In some embodiments, the movement direction may be variable, in order to provide variation in the shape of the deposited layer. As will be understood, the movement direction may be defined by absolute movement of the substrate alone, by absolute movement of the powder beam alone, or by a combination of movement of the substrate and the powder beam. In these circumstances, it is preferred for the laser source to be moveable relative to the powder beam, in order to preserve the elevation angle of 80° or less and the azimuthal angle of ±60° or less, with reference to the varying movement direction.

In a sixth aspect, there is a provided an apparatus for carrying out the process of the fifth aspect, wherein there are provided at least two laser sources arrayed around the powder beam footprint, each providing a different laser beam direction and each laser beam direction satisfying the requirement of an elevation angle of 80° or less and an azimuthal angle of ±60° or less.

Preferably, where there are two or more laser sources as set out above, the azimuthal angle for at least one of the laser sources is non-zero. More preferably, the azimuthal angle for said two or more laser sources is non-zero, e.g. 5° or greater.

Providing at least two laser sources in this way, operating along different directions, allows the apparatus to reduce the risk of unwanted differential heating of the substrate, thereby allowing the formation of a layer of improved uniformity.

In a seventh aspect, there is a provided an apparatus for carrying out the process of the fifth aspect, wherein there are provided at least three laser sources arrayed around the powder beam footprint, the angular spacing between the laser sources being 120° or less. In one particularly preferred embodiment, the angular spacing between angularly adjacent laser sources is about 120°. Where more than three laser sources are provided, the angular spacing between angularly adjacent laser sources is less than 120°.

This array of laser sources allows the movement direction of the substrate relative to the powder beam to be in any arbitrary direction, since the requirement of the azimuthal angle to be ±60° or less can then be met for any movement direction. This allows the laser sources, if desired, to be fixed in position with respect to the powder beam, which can simplify the construction and operation of the apparatus.

The third, fourth, fifth, sixth and/or seventh aspect of the invention may be combined with the first and/or second aspect of the invention. Additionally, any one of (or any combination of) the optional feature set out with respect to the first and second aspect may be combined with the third, fourth, fifth, sixth and/or seventh aspect.

Further optional features of the invention are set out below.

BRIEF DESCRIPTION OF THE DRAWINGS

FIG. 1 shows a schematic side view of a laser-assisted cold spray deposition process in which the laser beam (Gaussian intensity profile) and the powder beam are coaxial.

FIG. 1A shows a schematic plan view of the arrangement of FIG. 1.

FIG. 2 shows a plot of the measured temperature profile for the surface of the substrate for the arrangement of FIGS. 1 and 1A along the x-axis through the centre of the laser beam.

Figure 3:
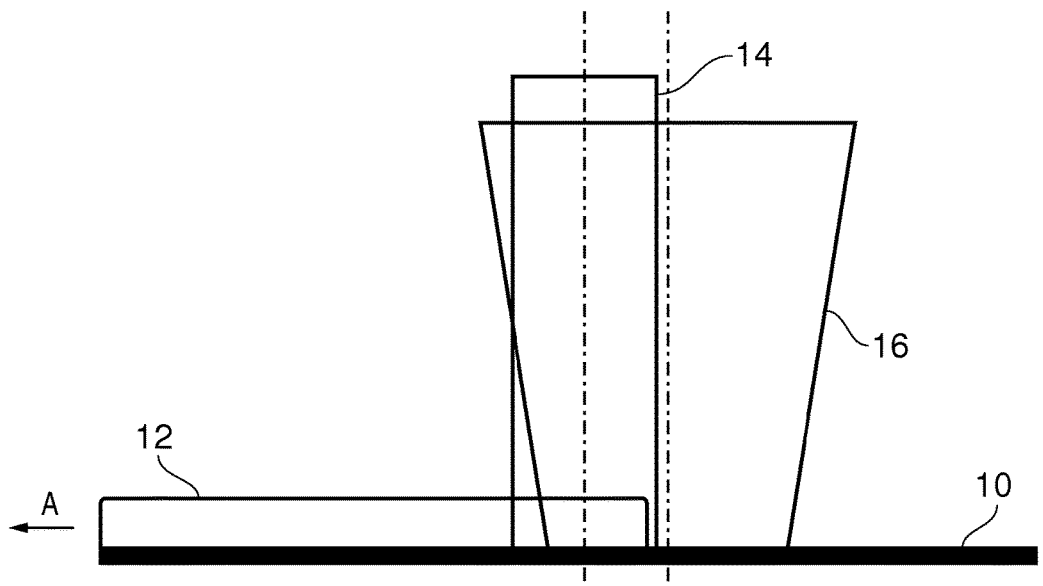
FIG. 3 shows a schematic side view of a laser-assisted cold spray deposition process in which the axis of the laser beam (Gaussian intensity profile) is displaced forwardly of the axis of the powder beam.

DETAILED DESCRIPTION OF THE PREFERRED EMBODIMENTS AND OPTIONAL ADDITIONAL FEATURES OF THE INVENTION

Preferred embodiments of the invention will now be described, with reference to the drawings. Additionally, some arrangements are described and illustrated which are outside the scope of protection, but they are described and illustrated in order to provide a fuller understanding of the invention.

Cold spraying (CS) is a process in which high velocity particles impact and bond onto a substrate when their velocities are above a critical value. Achieving this critical value typically involves the use of a high mach number gas (e.g. helium) and gas heating. In the preferred embodiments of the present invention, localised heating of the substrate facilitates a reduction of the critical velocity allowing for the use of lower cost carrier gas (e.g. nitrogen) and/or a reduction in the amount of gas heating required. Both of these significantly reduce the potential cost of the process implementation.

FIGS. 1 and 2 illustrate an arrangement which is presented for reference in order to assist in an understanding of the preferred embodiments of the invention.

In FIG. 1, a substrate 10 is provided. In many of the embodiments of the invention, substrate 10 is formed of steel. Steel is present here as being used in an embodiment of the invention but it will be understood that this invention is not necessarily limited to the use of steel substrates. However, other substrate materials are contemplated and can be used. A layer 12 is deposited on the substrate 10 by the process described in more detail below.

The substrate is moved in direction A. A powder beam 14 is formed in a known manner by entraining powder particles of typical diameter 5-50 μm into a high speed flow of an inert carrier gas such as nitrogen and ejecting the powder beam from a suitably-located nozzle (not shown). A laser source directs high intensity laser light in the form of a laser beam 16 to be coaxial with the powder beam. The temperature of the surface of the substrate is measured using a pyrometer.

Typically, the kinetic energy Ek of the powder particles in the powder beam 14 is not uniform across the diameter of the powder beam. Instead, it is typical for the powder particles towards the centre of the powder beam to have higher energies than those towards the outside of the powder beam. The distribution of Ek across the diameter of the powder beam may, for example, be Gaussian or near-Gaussian.

Similarly, in typical arrangements, the distribution of intensity across conventional laser beams is not uniform but instead is also Gaussian or near-Gaussian, being greater towards the centre of the beam.

FIG. 2 shows plots of measured temperature profiles for the surface of the substrate for the arrangement of FIG. 1.

FIG. 2 is aligned with FIG. 1, so that the zero on the x-axis is aligned with the centre of the laser beam 16. The temperature distribution at the substrate along the x-axis is shown in FIG. 2. This demonstrates that the highest temperature is found behind the powder beam. This is wasteful and inefficient. Also, there is insufficient heating forward of the powder beam to allow the substrate to be conditioned to achieve good adherence and compaction of the incoming particles. Furthermore, the deposited layer typically has a different (and typically higher) absorption property for the laser light. This can result in the deposited layer being subjected to a temperature which is too high, leading to unwanted melting or even removal of the deposited layer.

Figure 4:
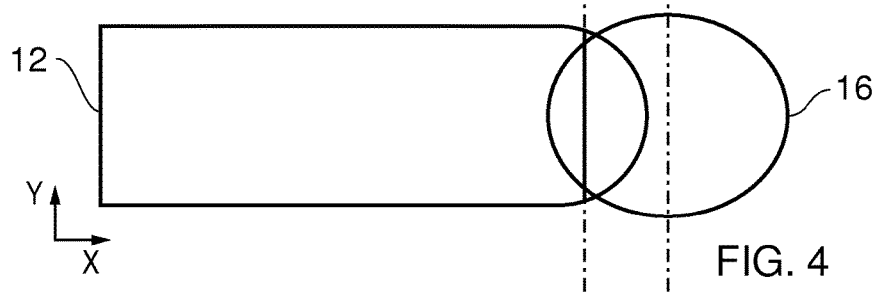
FIG. 4 shows a schematic plan view of the arrangement of FIG. 3.
Figure 5:
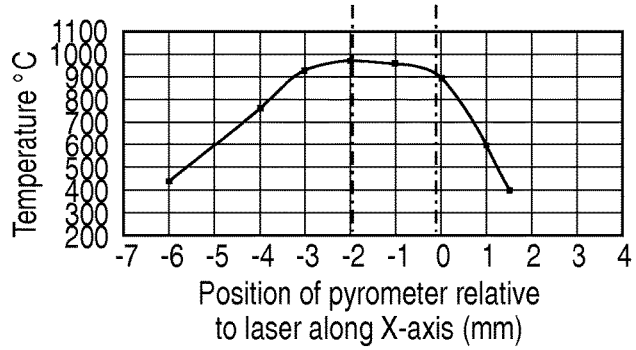
FIG. 5 shows a plot of the measured temperature profile for the surface of the substrate for the arrangement of FIG. 3, measured in a similar manner as FIG. 2.

FIG. 3 shows a schematic side view of a laser-assisted cold spray deposition process in which the axis of the laser beam is displaced forwardly of the axis of the powder beam. This is a modification of the arrangement of FIG. 1. The laser beam once more has a Gaussian intensity profile. FIG. 4 shows a schematic plan view of the arrangement of FIG. 3. FIG. 5 shows plots of measured temperature profiles for the surface of the substrate for the arrangement of FIG. 3. Again, FIG. 5 is aligned with FIG. 3, so that the zero on the x-axis is aligned with the centre of the laser beam 16. The temperature distribution at the substrate along the x-axis is shown in FIG. 5. This demonstrates that the highest temperature is found at the centre of the powder beam. This assists in the generation of a suitable temperature profile at the substrate to ensure good adherence of the incoming powder particles onto the substrate without waste of the laser energy. Furthermore, displacing the axis of the laser beam forwardly of the axis of the powder beam means that less laser energy is directed to the already-formed (and typically high absorbent) layer 12, meaning that there is a reduced risk of melting or burning away of the deposited layer 12.

Figure 6:
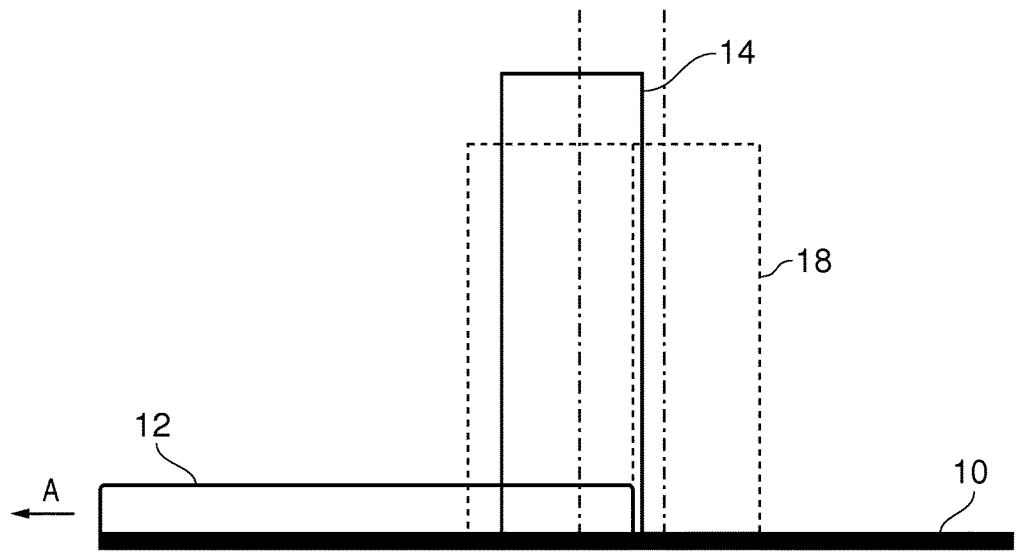
FIG. 6 shows a schematic side view of a laser-assisted cold spray deposition process in which the laser beam has a tailored intensity profile.
Figure 7:
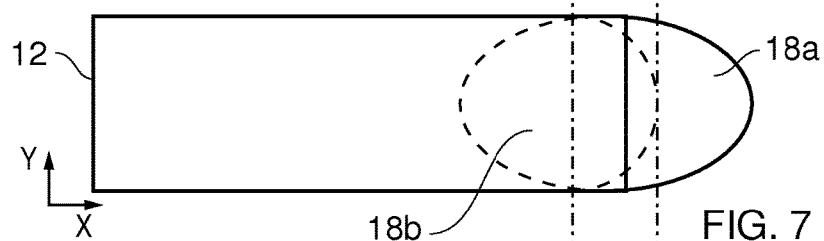
FIG. 7 shows a schematic plan view of the arrangement of FIG. 6.

FIG. 6 shows a schematic side view of a laser-assisted cold spray deposition process which is a modification of the arrangement of FIG. 3 in that the laser beam 18 has a spatial intensity profile that is tailored to further improve the deposition characteristics in the process. As shown in FIG. 7 (plan view), laser beam 18 has a forward portion 18a which has a relatively high intensity and a rearwards portion 18b which has a relatively low intensity. Forward portion 18a is forwards of the powder beam, meaning that the forward portion does not overlap with the powder beam footprint. The effect of this is that the heating provided by forward portion 18a is only dependent on the absorption of the laser light by the surface of the substrate 10. Rearwards portion 18b of the laser beam overlaps with the powder beam footprint and with part of the deposited layer that is rearwards of the powder beam footprint. In view of the higher absorption at the deposited layer, the intensity of the rearwards portion of the laser beam is correspondingly lower, in order to avoid melting or removal of the deposited layer. Heating of the deposited layer to a limited extent can assist with compaction and/or stress relief of the deposited layer.

Control of the spatial intensity of the laser beam 18 is provided by an optical element (not shown) that is typically a refractive optical element. However, a diffractive or reflective optical element may be used. The control provided by such an optical element is typically fixed control—i.e. the resultant spatial intensity profile of the laser beam is typically fixed for a particular optical element. However, it is possible to use different optical elements (providing different spatial intensity profiles) for different coating conditions, e.g. different substrates, different coating materials, etc. Swapping suitable optical elements in and out of the system may be done in an automated manner, e.g. robotically (for safety and reproducibility reasons).

Figure 9:
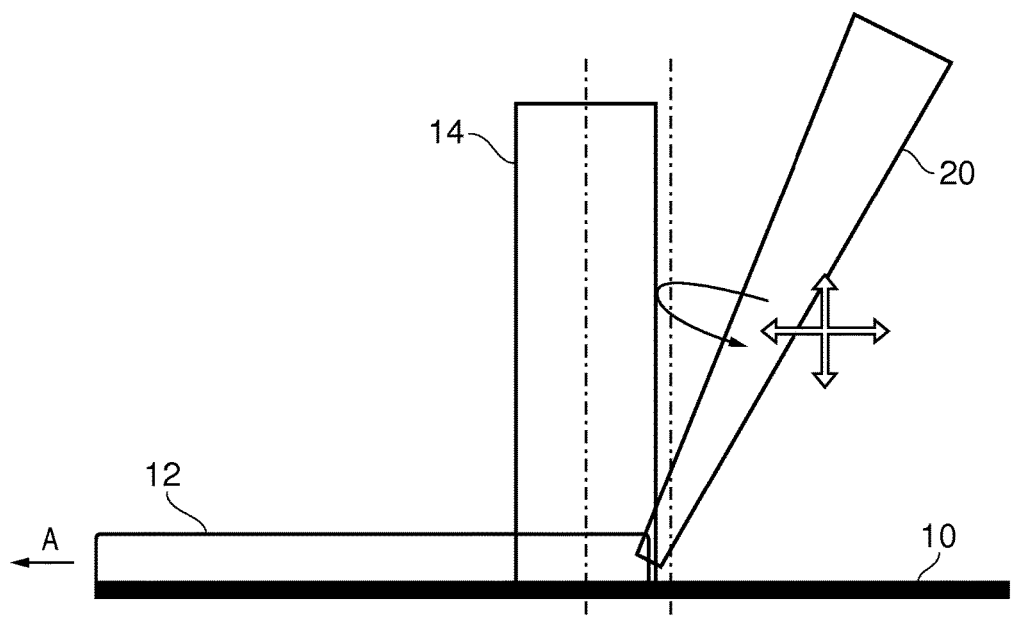
FIG. 9 shows a schematic side view of a laser-assisted cold spray deposition process in which the laser beam is scanned at the substrate in order to provide a required intensity profile.
Figure 10:
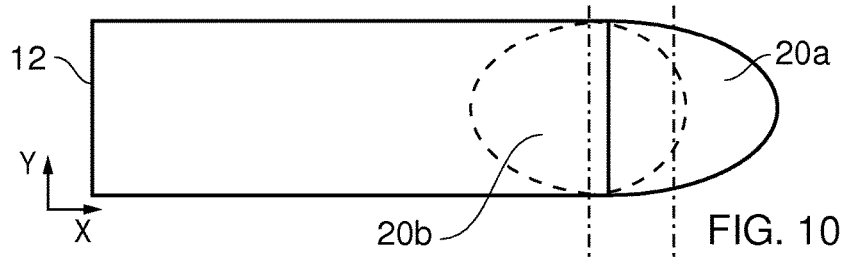
FIG. 10 shows a schematic plan view of the arrangement of FIG. 9.
Figure 11:
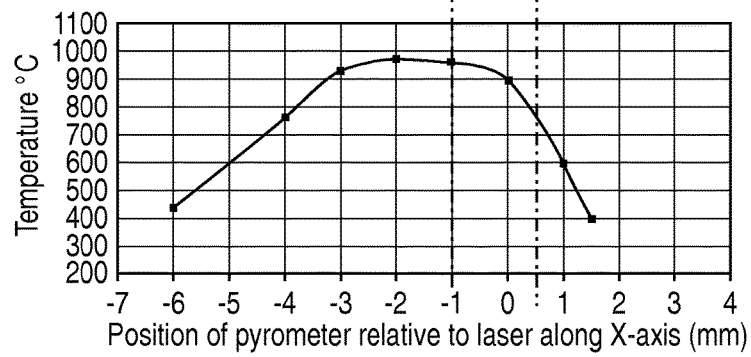
FIG. 11 shows plots of measured temperature profiles for the surface of the substrate for the arrangement of FIG. 9.

FIG. 9 shows a schematic side view of a laser-assisted cold spray deposition process which is a modification of the arrangement of FIG. 6 in that the required laser intensity profile is provided by suitable control of scanning of the laser beam 20. As shown in FIG. 10 (plan view), the laser beam footprint has a forward portion 20a which has a relatively high intensity and a rearwards portion 20b which has a relatively low intensity. In a similar manner to the arrangement of FIGS. 6 and 7, forward portion 20a is forwards of the powder beam, meaning that the forward portion does not overlap with the powder beam footprint and so can have a high intensity to ensure that a sufficient amount of laser energy is absorbed by the substrate. Rearwards portion 20b of the laser beam footprint has a lower intensity because it overlaps with the powder beam footprint and with part of the deposited layer that is rearwards of the powder beam footprint.

Figure 8:
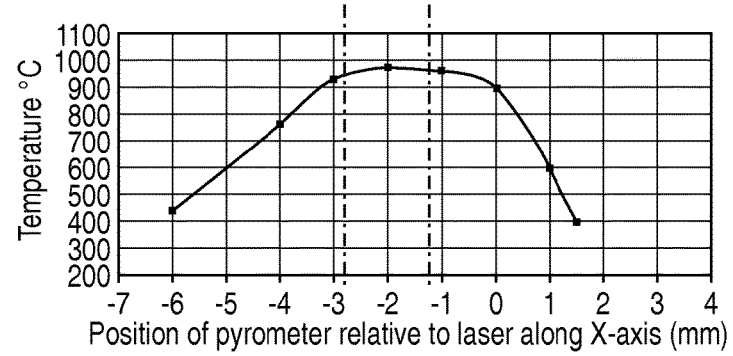
FIG. 8 shows a plot of the measured temperature profile for the surface of the substrate for the arrangement of FIG. 6.

Suitable scanning optics will be well known to the skilled person in order to provide suitable control of the spatial intensity of the laser beam footprint. The advantage of this arrangement in comparison to the arrangement of FIGS. 6-8 is that the relative intensity of the different parts of the laser beam footprint can be controlled in real time and can be adjusted according to the circumstances. This allows the laser assisted cold spray deposition process to be extremely flexible in terms of the materials that can be deposited and the substrates that such materials can be deposited on.

Accordingly, in these preferred embodiments of the invention, the laser is fired in the vicinity of the powder beam footprint in order to increase the local temperature reducing the yield stress of the material of the substrate (i.e. the original substrate and/or any previously deposited particles). Localised spatial control of the heat input improves (and in the most preferred embodiments, maximises) the process efficiency. This is particularly apparent in the deposition of the first layer, were a significant amount of energy is typically needed ahead of the powder beam to enable adhesion, whereas overheating of the trailing edge can result in coating damage due to higher absorption levels.

This technology provides a very significant improvement in the application of cold spraying in view of the cost reductions and increases in coating speed that are possible. The technology has application, for example, in the production of anti-corrosion and/or anti-wear coatings.

The process has additional controllability when compared to more conventional cold spraying. For example, because the energy of the laser beam heats the substrate to a temperature at which particle adherence is possible, if the laser beam is turned off, the particles will not adhere to the substrate. This allows very precise patterning of the deposited layer because the laser beam can be controlled exceptionally tightly both in terms of spatial location and in terms of switching on and off. Furthermore, due to the control of the spatial temperature profile of the substrate using the laser, it is possible to heat only a very narrow track on the substrate, meaning that particles will adhere only at the narrow track. In this way, it is possible to deposit layers with a width that is smaller than the width of the powder beam, corresponding instead to the width of the track of the substrate heated to a suitable temperature.

The present inventors have considered the disclosure of Kulmala and Vuoristo (2008) in detail. They have assessed the disclosure of Kulmala and Vuoristo (2008) based on computer modelling, in order to determine the temperature profile of the substrate during processing.

Kulmala and Vuoristo (2008) discloses a low pressure cold spray process. Ceramic (alumina) powder particles are entrained in the powder beam in order to assist compaction. The substrates used are low carbon mild steel substrates.

The relevant parameters in Kulmala and Vuoristo (2008) are as follows:

Temperatures 650 to 1000° C.
At 650° C. laser powers 2.0 kW to 1.8 kW.
At 1000° C. laser powers 2.9 to 2.7 kW for multiple layers.
6 kW laser power available.
Processing speed 40 mm·s$^{-1}$.
Laser spot 5.8×23.5 mm.
Uniform intensity across laser spot.
Powder nozzle diameter 5 mm.
Powder beam diameter 5.8 mm.
Power absorption approximately 35%.

The surface temperature of a substrate can be measured using a pyrometer. When the substrate is heated using a laser, a suitable frequency filter can be used at the pyrometer to filter out the wavelength of the laser light. Power absorption can be determined by first measuring the reflectivity of the substrate, i.e. by measuring the intensity of light reflected from the substrate compared with the intensity of light incident at the substrate. The power absorption is then (1-reflectivity)×100, to express as a percentage. The temperature distribution in the substrate can then be determined in a known manner based on the thermal materials properties of the substrate, described below.

Figure 13:
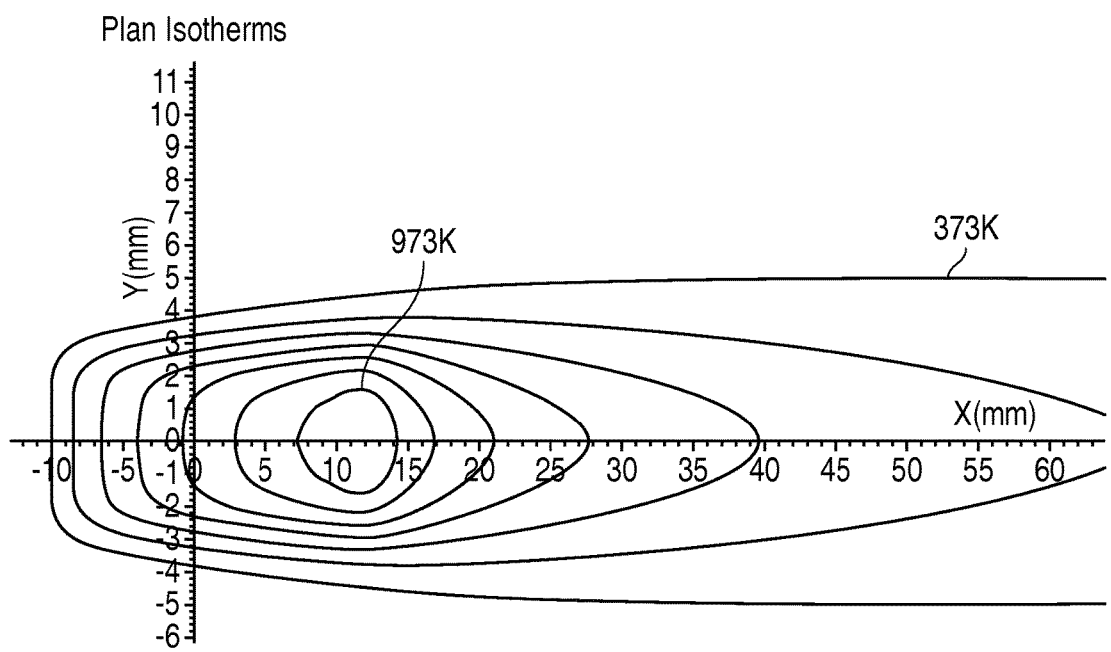
FIGS. 13-15 show the temperature profile results of modelling of a prior art disclosure.
Figure 14:
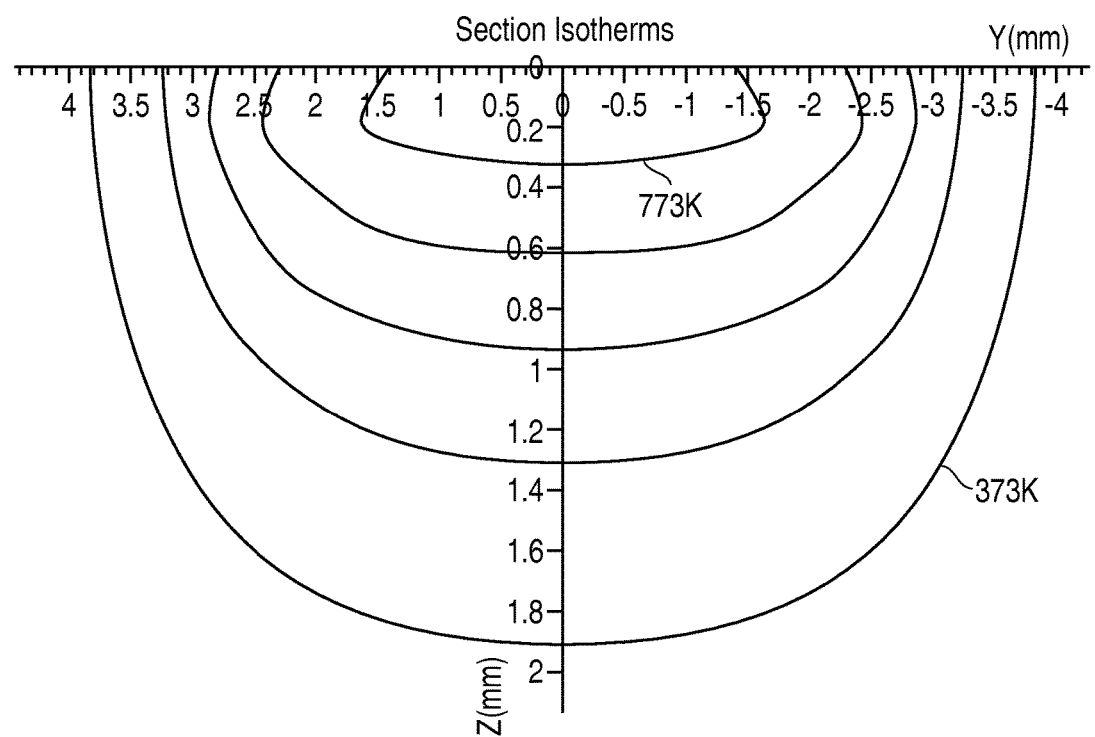
Figure 15:
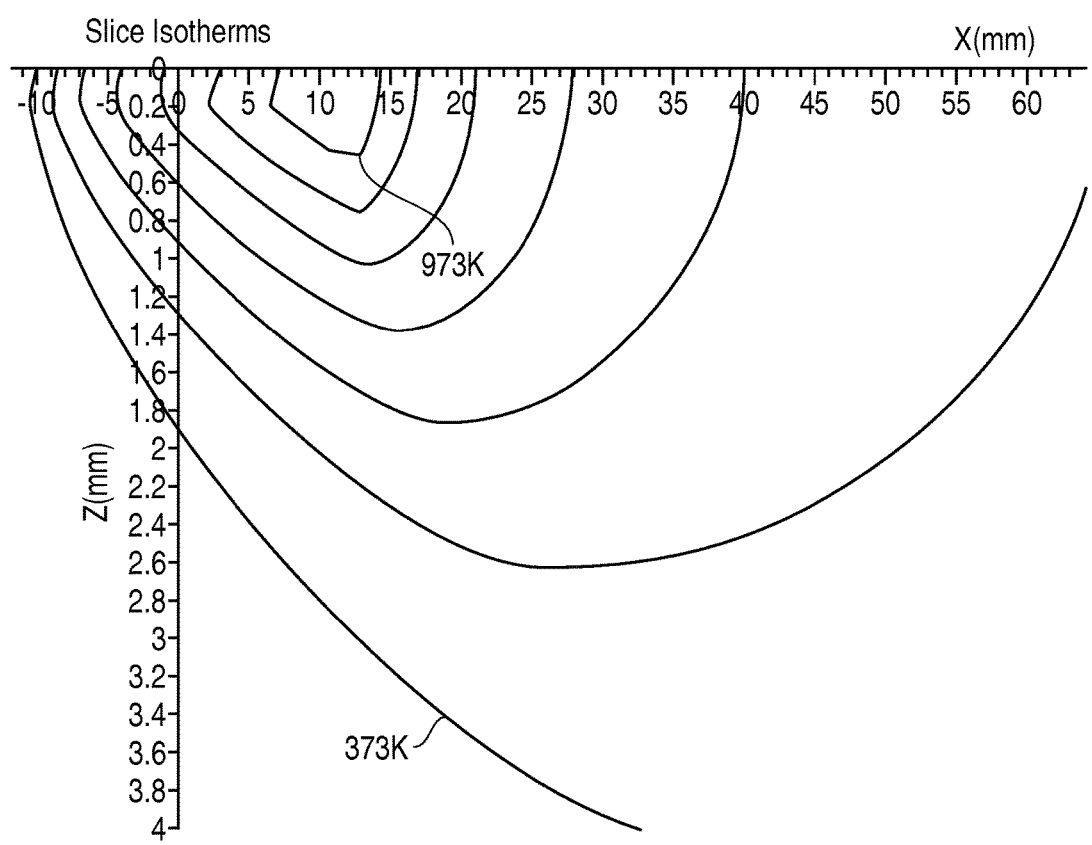
Figure 16:
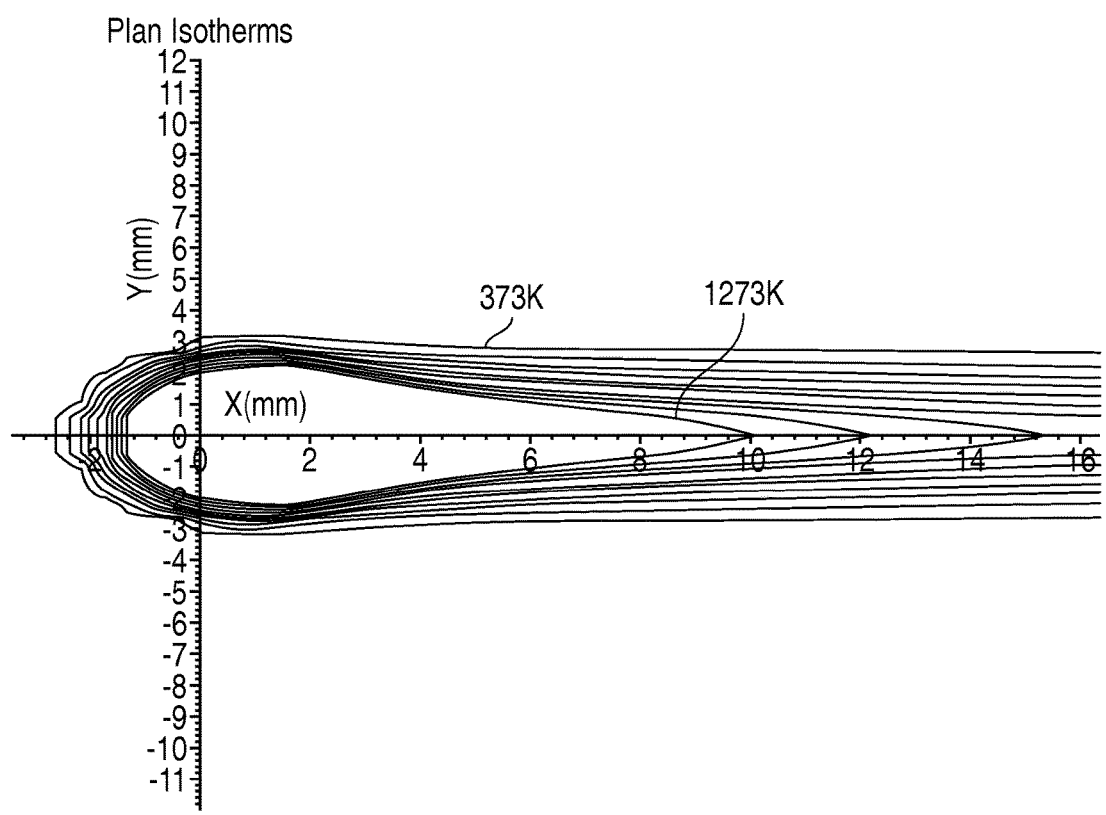
FIGS. 16-18 show the temperature profile results of modelling of an embodiment of the invention.
Figure 17:
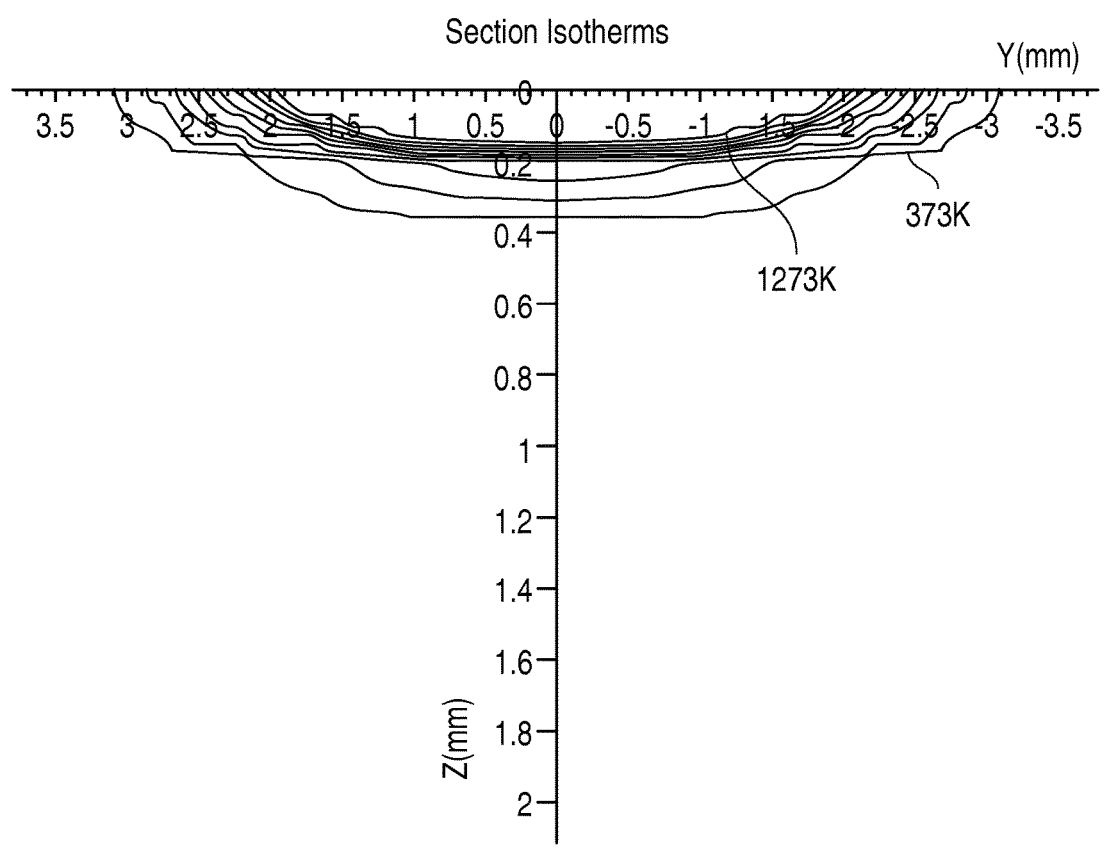
Figure 18:
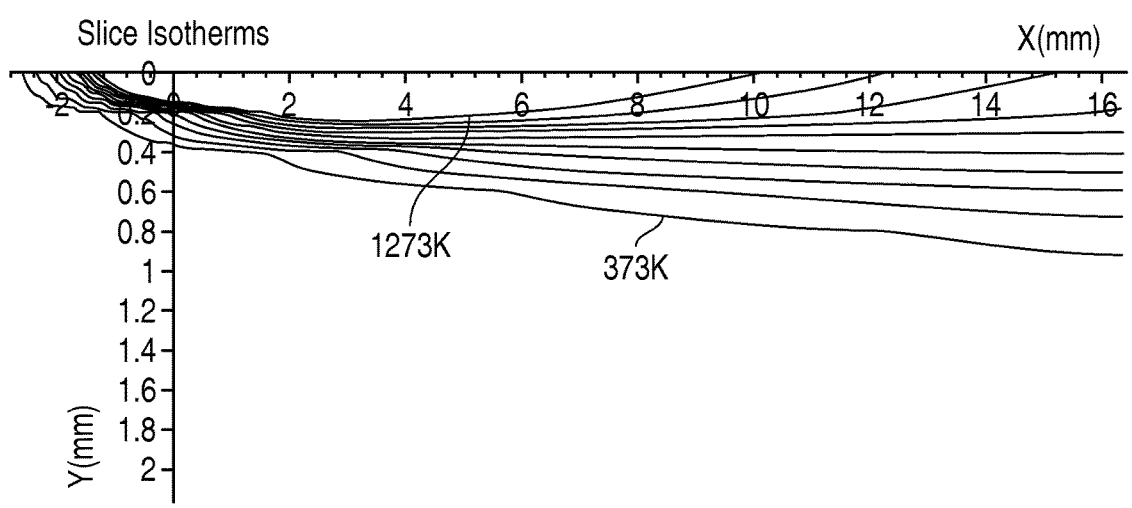

In FIGS. 13-18, temperature profiles are shown. The contours are 100K apart. In each of the figures, the lowest temperature contour is 373K. In FIGS. 13 and 15 the highest temperature contour is 973K. In FIG. 14 the highest temperature contour is 773K. In FIGS. 16-18 the highest temperature contour is 1273K.

It should be noted that the modelling work reported here is material dependent. Here, the substrate is steel. The material to be deposited in the modelling is Ti.

Figure 12:
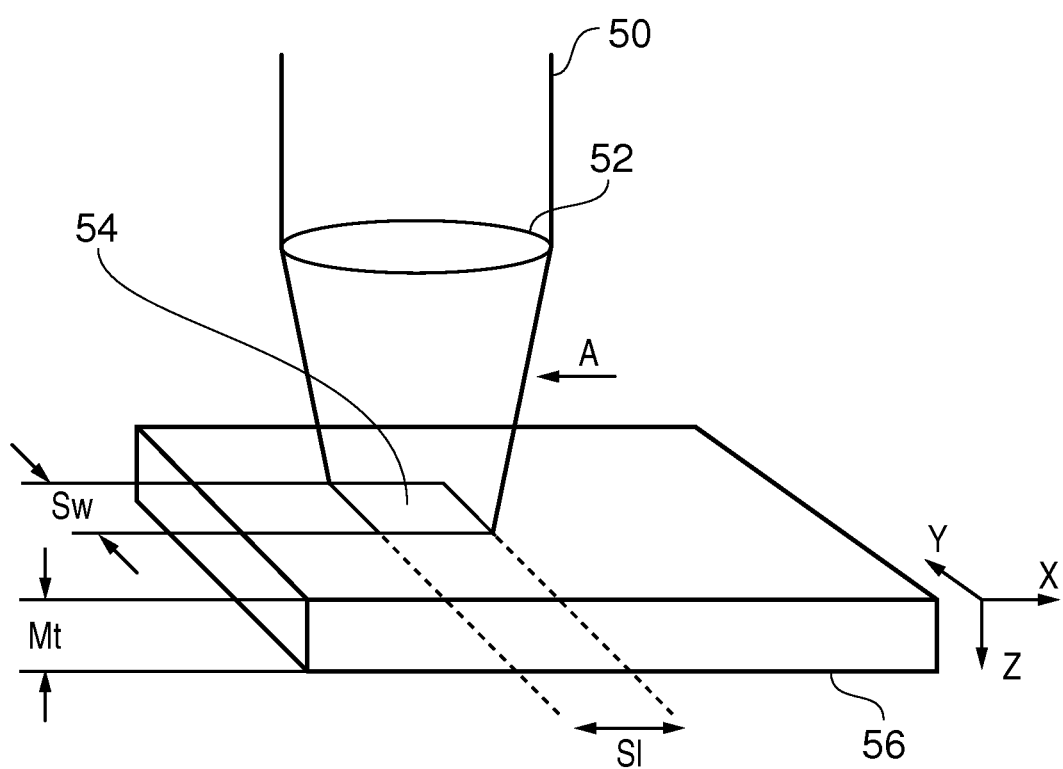
FIG. 12 shows a schematic view of an arrangement for modelling temperature profiles.

FIG. 12 shows a schematic view of an arrangement for modelling temperature profiles. A stationary laser source (not shown) provides a laser beam 50 that is passed through suitable beam optics 52 to form a laser footprint 54 of a specific shape on a substrate 56. The substrate 56 is moved in direction A order to provide relative movement between the substrate 56 and the laser footprint 54. Axes X, Y and Z are shown in FIG. 12. The relative movement between the substrate and the laser footprint is along axis X. The thickness direction of the substrate is along axis Z. The centre of the laser footprint is at X=Y=Z=0. At the beam footprint, the laser power is delivered to the substrate. The beam footprint width is Sw. The beam footprint length is Sl. The substrate thickness is Mt.

Based on the disclosure of Kulmala and Vuoristo (2008), the laser intensity is uniform across the laser footprint.

The low carbon mild steel substrate used in Kulmala and Vuoristo (2008) is assumed to have the following properties:

Thermal conductivity 25.6 W·m$^{-1}$·K$^{-1}$
Specific heat 925 J·kg$^{-1}$·K$^{-1}$
Density 7640 kg·m$^{-3}$
Melting temperature 1765K
Boiling temperature 3000K
Ambient temperature is assumed to be 20° C.

The resultant isotherms are shown in FIGS. 13, 14 and 15. FIG. 13 shows the temperature profile of the surface of the substrate in plan view. FIG. 14 shows the temperature profile of the substrate in a cross section view of the y-z plane (at x=0). FIG. 15 shows the temperature profile of the substrate in a cross section view of the x-z plane (at y=0). Based on the disclosure of Kulmala and Vuoristo (2008), the centre of the powder beam would be at about x=+9 mm in FIG. 15.

However, the present inventors consider that the arrangement in Kulmala and Vuoristo (2008) is inefficient. Much of the heat delivered to the substrate is wasted. Heating of the substrate is useful if it affects the adherence of the incoming powder particles. However, in Kulmala and Vuoristo (2008), much of the energy is used to heat deeper regions of the substrate (e.g. deeper than about 0.5 mm).

The temperature at the surface of the substrate at the powder beam footprint in Kulmala and Vuoristo (2008) is about 700° C. (973K). The temperature at about 0.5 mm from the surface below the powder beam footprint is about 600° C. (873K). The temperature at about 1 mm from the surface below the powder beam footprint is about 400° C. (673K). The temperature at about 2 mm from the surface below the powder beam footprint is about 200° C. (473K).

In an embodiment of the present invention, a titanium substrate is used. The dimension of the substrate are identical to those in Kulmala and Vuoristo (2008). The relevant parameters of this embodiment are as follows:

Maximum temperature 900° C.
4 kW laser power available.
Processing speed 500 mm·s$^{-1}$.
Laser spot diameter 6 mm.
Gaussian intensity profile across laser spot.
Power absorption approximately 40%.

The titanium substrate used in this embodiment has the following properties:

Thermal conductivity 6.8 W·m$^{-1}$·K$^{-1}$
Specific heat 564 J·kg$^{-1}$·K$^{-1}$
Density 4428 kg·m$^{-3}$
Melting temperature 1941K
Boiling temperature 3560K The resultant isotherms are shown in FIGS. 16, 17 and 18. FIG. 16 shows the temperature profile of the surface of the substrate in plan view. FIG. 17 shows the temperature profile of the substrate in a cross section view of the y-z plane (at x=0). FIG. 18 shows the temperature profile of the substrate in a cross section view of the x-z plane (at y=0). The preferred location for the centre of a powder beam would be at about x=+3 mm in FIG. 18.

As can be seen from these results, this embodiment of the invention provides suitably deep heating of the substrate in order to promote good adhesion and density of the deposited layer but avoids the wastage of heat into the deeper parts of the substrate below the powder beam footprint.

Figure 19:
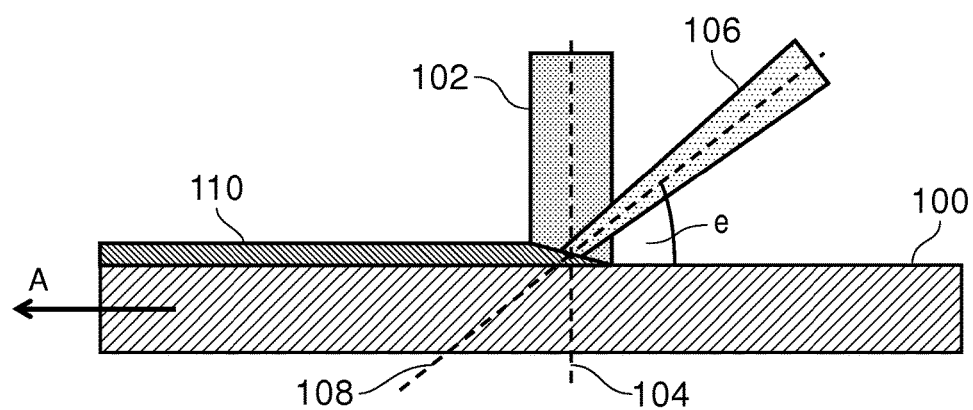
FIG. 19 shows a cross sectional view of a cold spray deposition process according to an embodiment of the invention.
Figure 20:
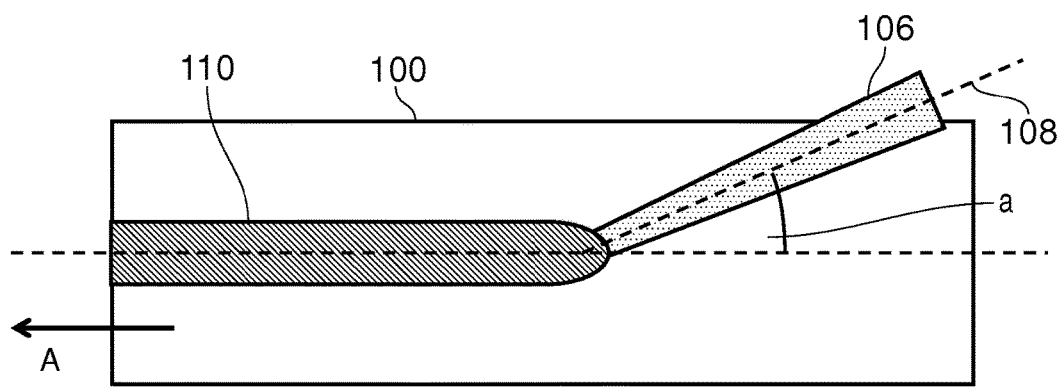
FIG. 20 shows a plan view of the process of FIG. 19.

With reference to FIGS. 19 and 20, there is shown a substrate 100 moving in movement direction A. Onto the substrate is directed a powder beam 102 along a powder beam direction 104 and a laser beam 106 along a laser beam direction 108. In this embodiment, the laser beam heats the substrate at the powder beam footprint in order to deposit a layer 110 formed of the particulate material in the powder beam. The angle e subtended in FIG. 19 between the plane of the substrate 100 and the laser beam direction is the elevation angle. As will be clear, if the elevation angle was 90°, the laser beam direction would be parallel to the powder beam direction 102. However, in this embodiment, the elevation angle e is about 45°. Where the substrate is non-planar, the elevation angle e is defined with reference to a plane tangential to surface of the substrate at the centre of the laser beam footprint.

As shown in FIG. 20, angle a is the azimuthal angle of the laser beam direction 108. This is the acute angle subtended between the movement direction A and a projection of the laser beam direction onto the surface of the substrate 100.

Azimuthal angle a is ±60° or less from the movement direction. As will be understood, this places a restriction on the direction in which the substrate can be moved relative to the laser beam direction. If it is wanted to form a deposited layer in any direction on the surface of the substrate, it will be necessary either to provide a laser source that is moveable to provide the required laser beam direction, or it will be necessary to provide more than one laser beam source, to be switched in and out of operation depending on the shape of the track and hence the direction of movement of the substrate. Given the limitation of ±60° for the range of suitable laser beam directions for providing adequate shape for the deposited layer, it will be understood that preferably an array of laser sources is provided, preferably at least 3 laser sources, angularly arranged around the powder beam footprint with an angular spacing of 120° or less.

The term "laser source" here is intended to mean a device which functions to provide a laser beam along the required direction. Therefore where more than one laser source is provided, and thus more than one laser beam is provided, it is possible for the laser beams to be derived from the same laser. This can be done by a suitable arranged of optical elements such as fibre optics.

As discussed above, when the laser is applied in a non coaxial manner the direction which the laser enters the powder beam is significant. It has been found that if the azimuthal angle is greater than 60° then one or both of the deposition efficiency and track shape becomes impaired. When the laser is shaded by deposited powder the deposition efficiency of the process is altered. This manifests as a distortion of the track when the laser is primarily coming into the side of the deposit. When incident from the rear of the track there is a uniform drop in deposition efficiency.

Figure 21:
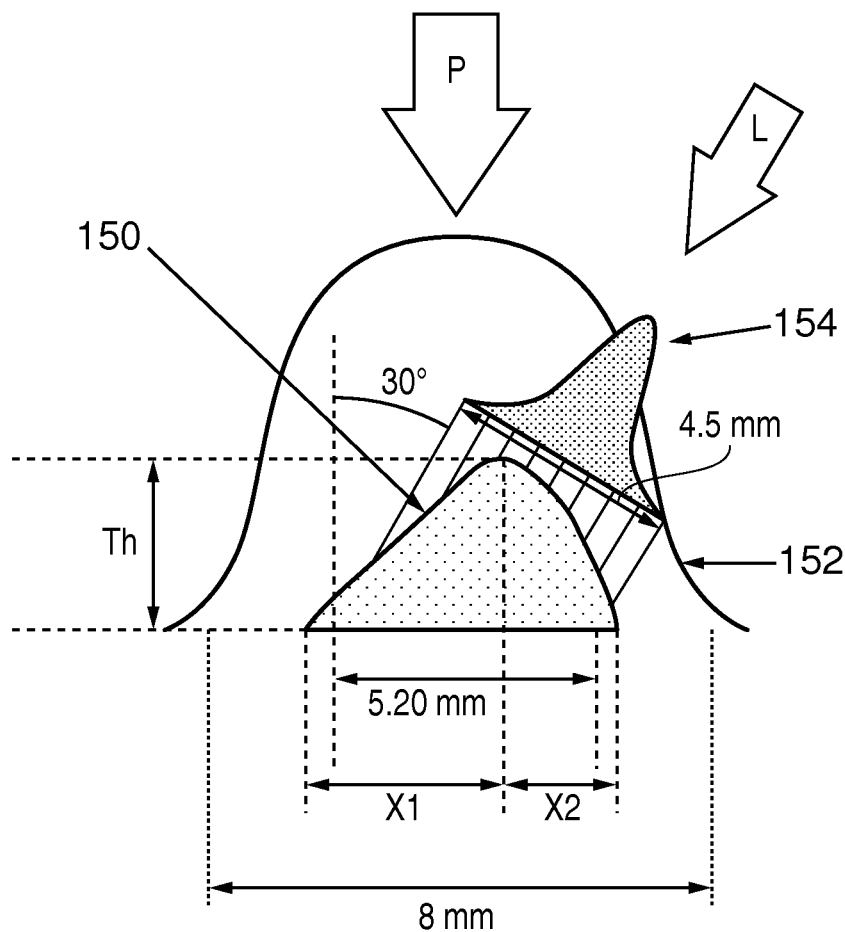
FIG. 21 shows a schematic cross sectional view of the deposition of a titanium track layer on a steel substrate, the view being taken in a direction across the width of the track.

FIG. 21 illustrates the situation. Here there is shown a schematic cross sectional view of the deposition of a titanium track layer 150 on a steel substrate (not shown), the view being taken in a direction across the width of the track. The mass distribution 152 across the powder jet P is shown as a symmetrical, near-Gaussian distribution. However, if the laser beam L arrives at a non-zero azimuthal angle (here 30°), then the shape of the track 150 becomes asymmetrical (as seen by X1 and X2 being unequal), due to the differential heating at the powder footprint. In FIG. 21, the track height is Th, the powder beam footprint width is 8 mm, the laser footprint is 4.5 mm and the laser power distribution is 154.

Figure 22:
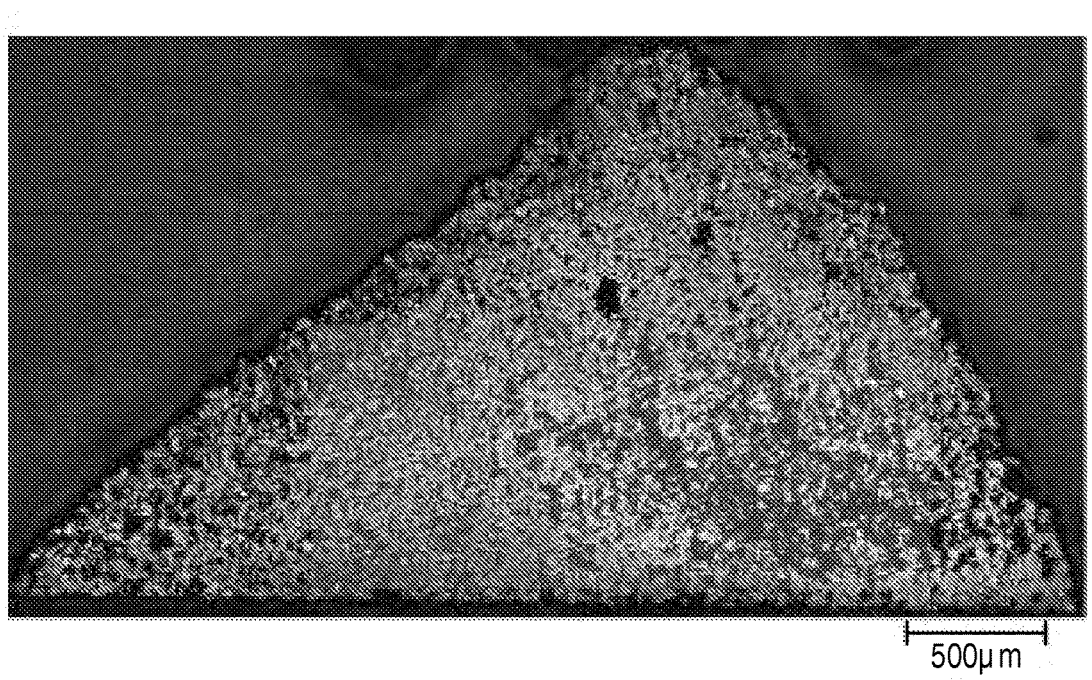
FIG. 22 shows an optical micrograph of the cross section of the track illustrated in FIG. 21.

FIG. 22 shows an optical micrograph of the cross section of the track described above.

FIGS. 23-26 illustrate another embodiment of the invention, adapted to control the track shape and to allow the track direction to be varied at will. Similar features already described with reference to FIGS. 19 and 20 are given the same reference numbers and are not necessarily described again.

Figure 23:
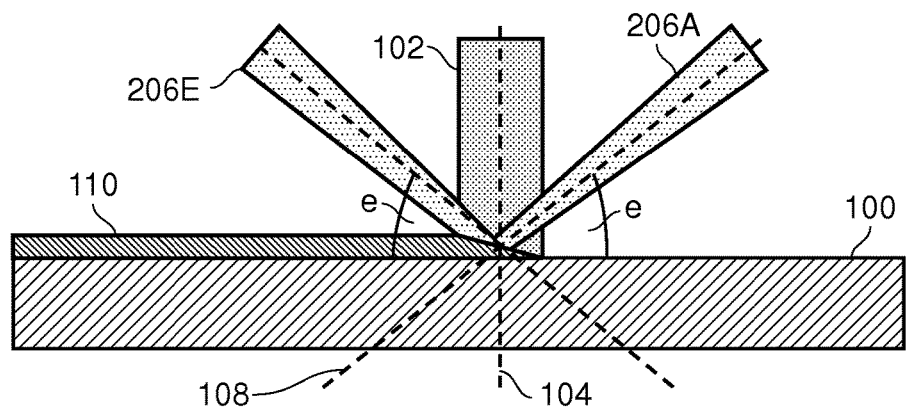
FIG. 23 shows a cross sectional view of a cold spray deposition process used in another embodiment of the invention.
Figure 24:
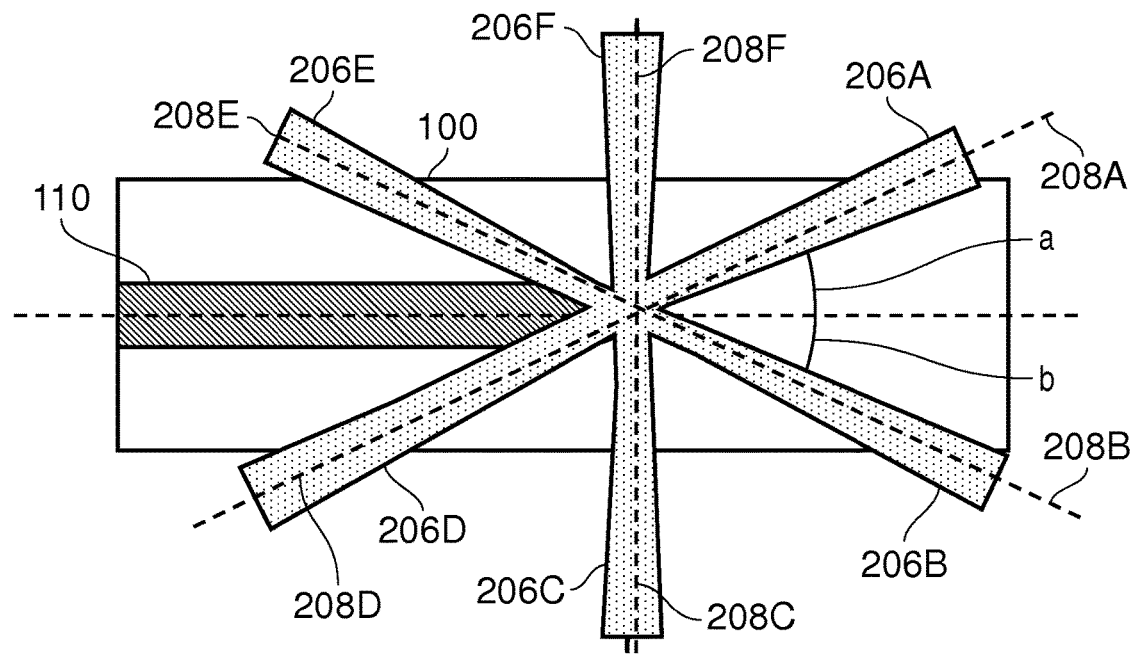
FIG. 24 shows a schematic plan view of the arrangement of FIG. 23.

In FIGS. 23 and 24, 6 incoming laser beams 206A-206F are provided along respective directions 208A-208F. Azimuthal angle A is about 30°, and azimuthal angle B is about −30°. As will be understood, the measurement of these azimuthal angles depends on the direction of movement of the substrate as shown in FIGS. 19 and 20. Azimuthal angles for beams 206C, D, E and F are not shown but can be measured according to the explanation above. As shown in FIG. 23, elevation angle e of the laser beams 206A and 206E is the same and is about 45°.

Figure 25:
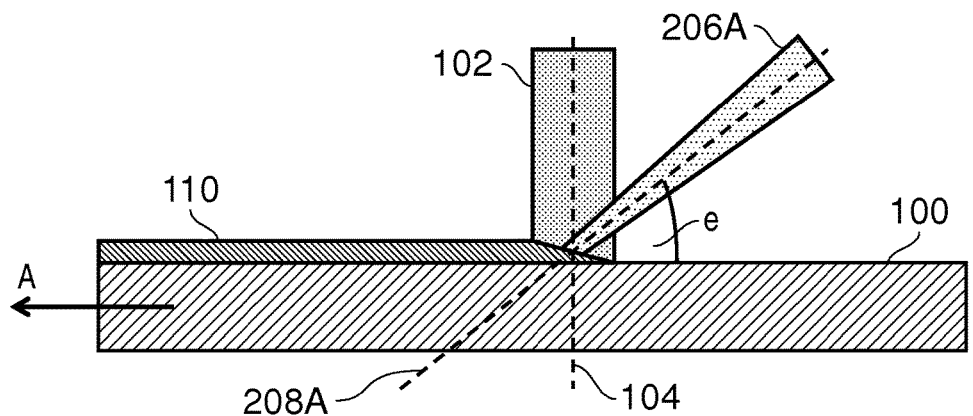
FIG. 25 shows one mode of operation of the embodiment of FIG. 23.
Figure 26:
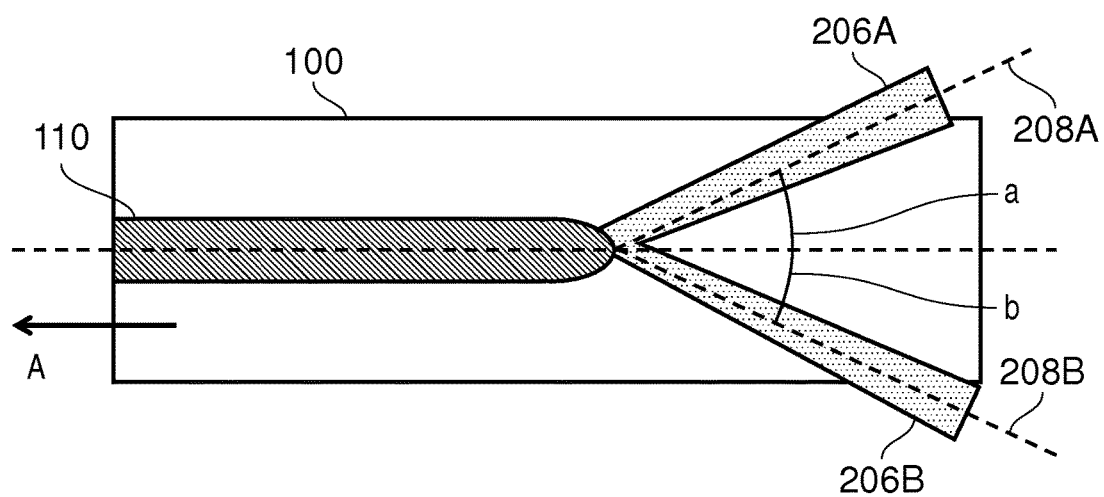
FIG. 26 shows a schematic plan view of the arrangement of FIG. 25.

As shown in FIGS. 25 and 26, when the substrate is moved in direction A, trailing and side-facing laser beams 206C, D, E and F can be switched out of operation. As will be understood, the substrate direction can be changed and one or more of the laser beams 206C, D, E and F can be switched into operation in order to provide a suitable heating profile for the substrate, the powder footprint region and/or the deposited layer. This arrangement therefore allows the substrate to move in any direction desirable to form a deposition track, by suitable switching in and out of operation the various laser sources as needed.

Figure 27:
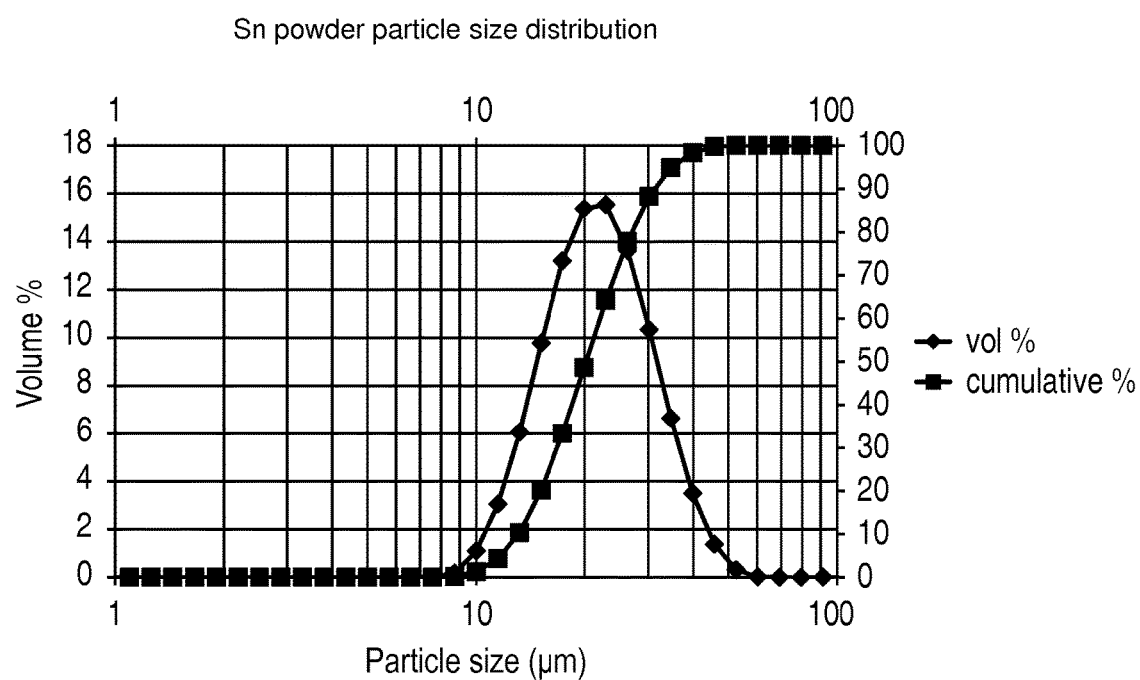
FIG. 27 shows the particle size distribution of a Sn powder.

FIG. 27 shows the particle size distribution of a Sn powder, showing a typical particle size distribution measured using a Malvern Mastersizer 2000 instrument. The shape of the distribution is typical of powders suitable for use with embodiments of the invention, but it is noted here that the average particle size shown in FIG. 27 is slightly too low for optimum suitability with the preferred embodiments of the invention. Alternative powders that can be used are, for example, Ti powder or stellite powder. Stellite is a Co—Cr alloy. Typically, the average particle size required for use in the invention depends to some extent on the density of the material to be sprayed. A more dense material (e.g. stellite) typically requires a finer particle size because particles that are too large will not accelerate well enough in the gas jet. A suitable average particle size for stellite is about 40 μm. A less dense material (e.g. Ti) has a coarser particle size for use in the embodiments of the invention. A suitable average particle size for Ti is about 55 μm.

Figure 28:
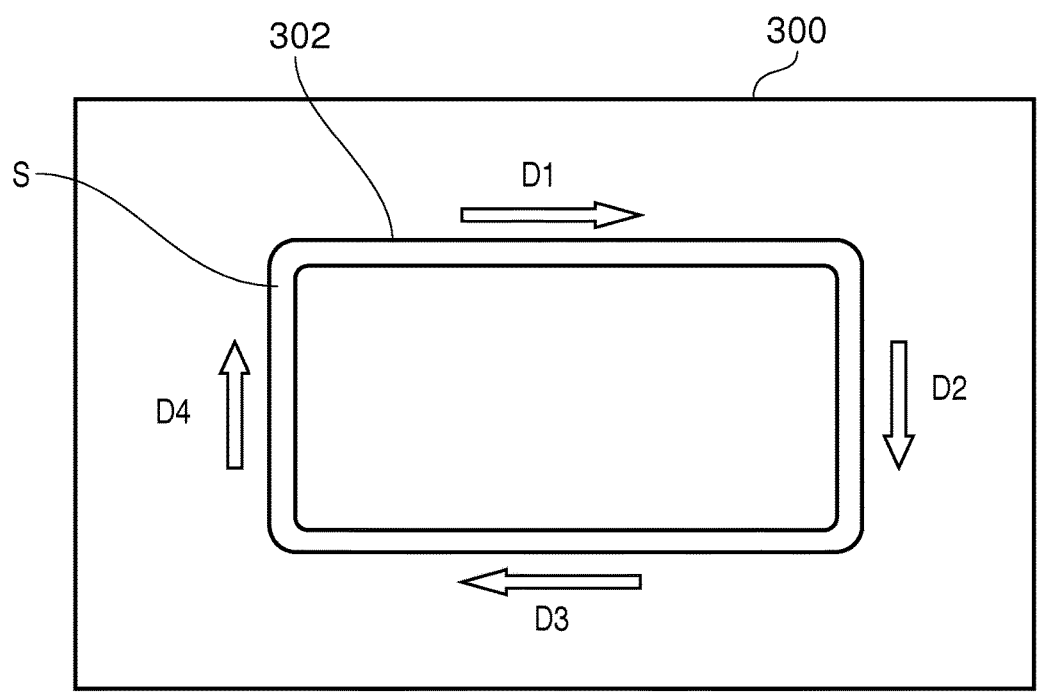
FIG. 28 shows a schematic plan view of a rectangular track deposited on a substrate to illustrate the effect of azimuthal angle.

Experimental work to show the advantage of the preferred embodiment of the invention has been carried out, as illustrated in FIG. 28 which shows a schematic plan view of a rectangular track 302 deposited on a substrate 300 to illustrate the effect of azimuthal angle.

A powder beam was formed to impinge perpendicularly on a substrate as described above. The laser beam had an elevation angle of about 60°. The direction of movement of the substrate with respect to the powder beam and laser beam was varied so as to vary only the azimuthal angle. The specific variation used in this experiment was to form a deposited layer along the outline of a rectangular track, starting at position S. The track was deposited first along direction D1, along one side of the rectangle, with the azimuthal angle at 0°. Then the direction of movement of the substrate was changed and the track was then deposited along the next side of the rectangle along direction D2, with the azimuthal angle at 90°. Next, the direction of movement of the substrate was changed again and the track was deposited along the next side of the rectangle along direction D3, with the azimuthal angle at 180°. Finally, the direction of movement of the substrate was changed again and the track was deposited along the next side of the rectangle along direction D4, with the azimuthal angle at 270°, to return to position S.

The relative deposition efficiency for each side of the rectangle was determined, on the fair assumption that the particle beam was constant and the laser power was constant during the full spraying treatment. The results showed that the deposition efficiency for azimuthal angle being 0° was significantly better than the deposition efficiency for the other azimuthal angles tested in the experiment.

Figure 29:
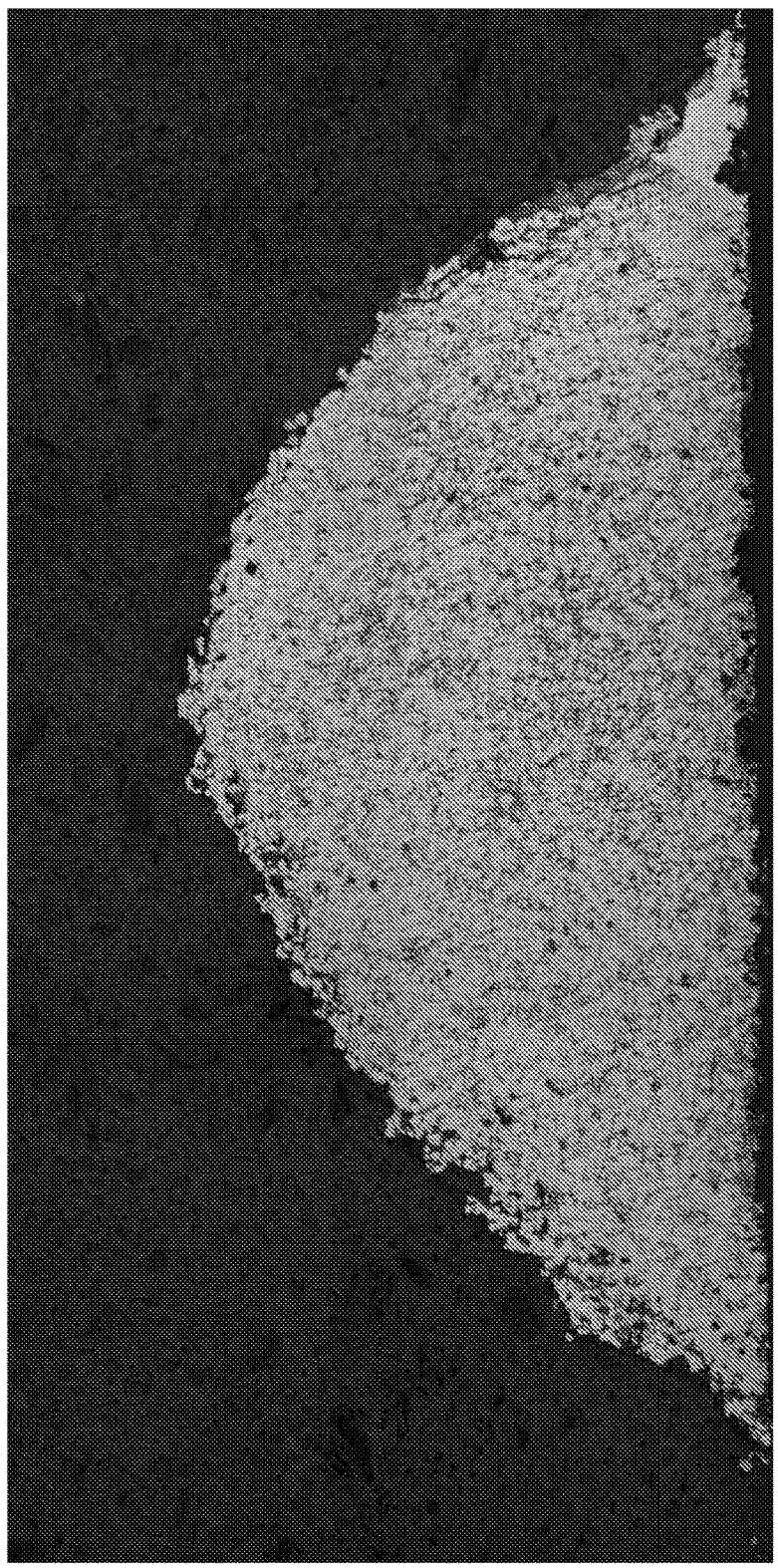
FIG. 29 shows a cross sectional micrographic view of the track taken for the track deposited in direction D1 in FIG. 28.
Figure 30:
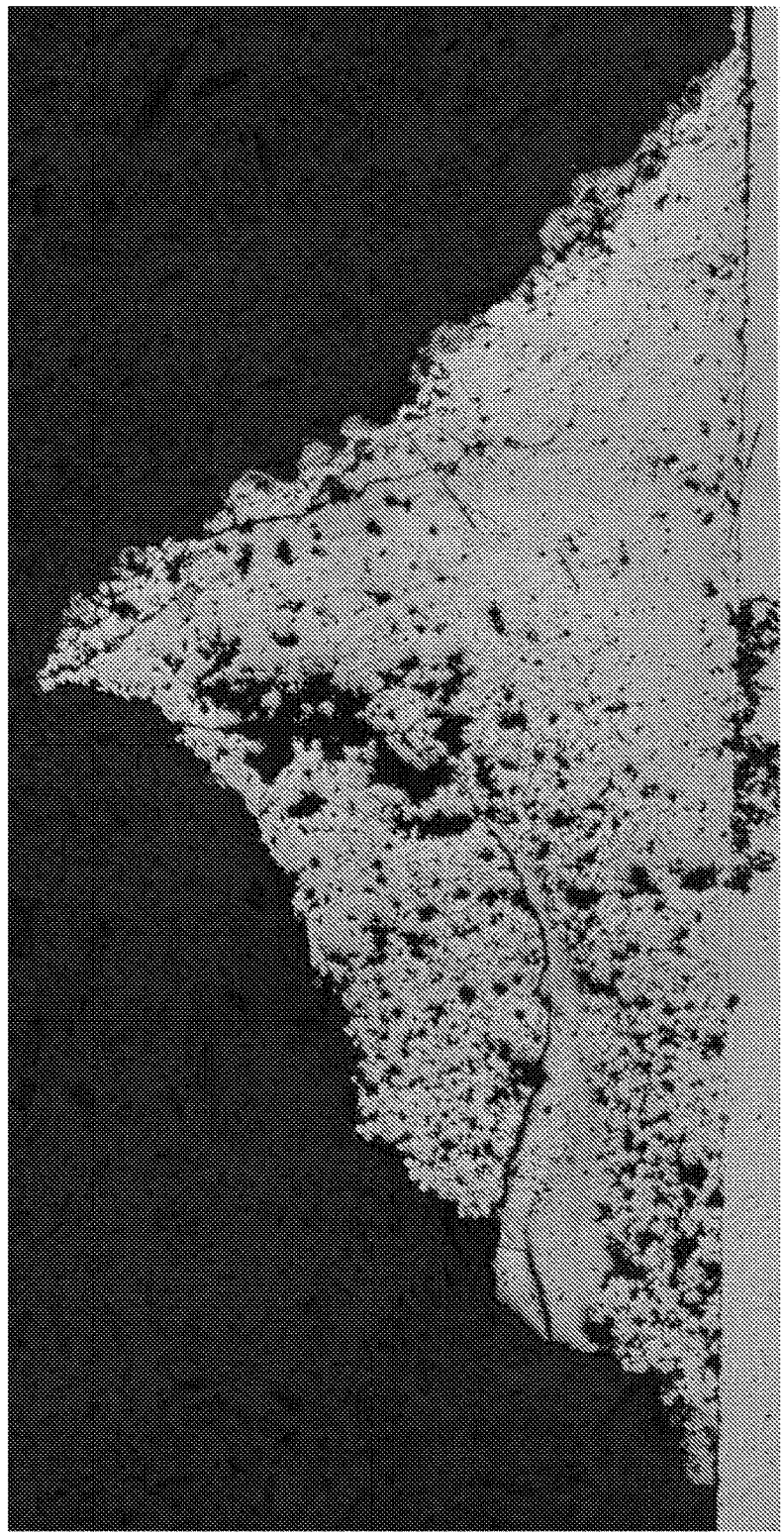
FIG. 30 shows a cross sectional micrographic view of the track taken for the track deposited in direction D2 in FIG. 28.
Figure 31:
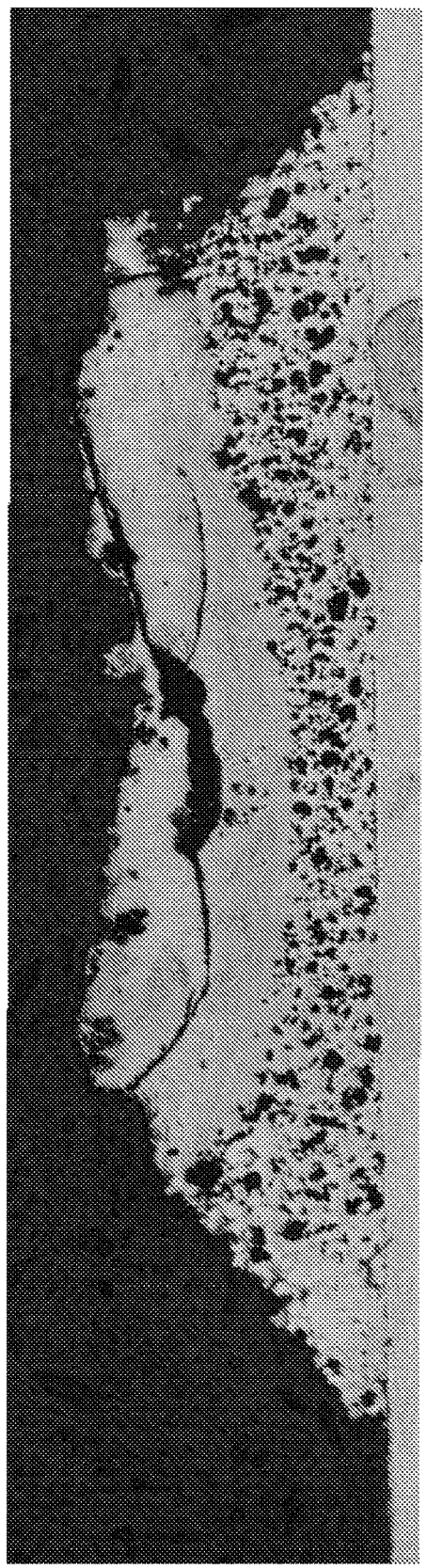
FIG. 31 shows a cross sectional micrographic view of the track taken for the track deposited in direction D3 in FIG. 28.

FIG. 29 shows a cross sectional micrographic view of the track taken for the track deposited in direction D1 in FIG. 28. FIG. 30 shows a cross sectional micrographic view of the track taken for the track deposited in direction D2 in FIG. 28. FIG. 31 shows a cross sectional micrographic view of the track taken for the track deposited in direction D3 in FIG.

28. Each micrographic image is of an etched microstructure. As can be seen, track D1 is relatively symmetrical and uniform in microstructure. However, where the azimuthal angle is 90°, 180° or 270° (−90°), the deposited tracks are asymmetrical and/or molten and partially oxidised.

The present inventors have also demonstrated the control of the deposition of Ti powder particles when the powder beam is maintained on but the laser is turned on and off to control the position of the formation of the deposited layer along the track. This has been demonstrated for a constant traverse speed along the substrate of 500 mm/min, the laser being turned on for 2 seconds at a time to deposit individual islands of the coating layer.

The invention is considered at present to have considerable merit for the deposition of coatings on tubes. Typically the coating is deposited on the external surface of the tube (e.g. as an anti-corrosion coating). In this application, typically the tube is rotated and the relative axial position between the powder beam footprint and the tube is controlled to provide a continuous coating.

The invention is also considered at present to have considerable merit for the deposition of coatings on relatively small localised area(s) of a substrate. This is of interest in particular for the repair of surface defects on high value components such as turbine blades. In this application, control over the azimuthal angle as defined above is considered to be particularly important, to allow the coating to be applied in a desired pattern to cover the localised area as required.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A coating process for the deposition of a layer of a first material onto a substrate of a second material, the second material optionally being different from the first material, the process including the steps:
    entraining powder particles of the first material into a carrier gas flow to form a powder beam directed to impinge on the substrate, thereby defining a powder beam footprint region at the substrate;
    causing relative movement of the powder beam and the substrate in a movement direction to move the powder beam footprint relative to the substrate to deposit the layer of the first material; and
    operating a laser source to direct a laser beam along a laser beam principal axis direction to provide a laser beam footprint to cause direct, local heating of at least one of the forward substrate region and the powder beam footprint region, without macroscopic melting of the first material,
the laser beam principal axis direction being defined with reference to a plane coincident with or tangential to a surface of the substrate at the centre of the laser beam footprint in terms of an elevation angle from the plane to the laser beam principal axis direction and in terms of an acute azimuthal angle from the movement direction to the laser beam principal axis direction, wherein the elevation angle is 80° or less and the azimuthal angle is ±60° or less.

2. The coating process according to claim 1, wherein the elevation angle is 30° or more.

3. The coating process according to claim 1, wherein the movement direction is variable, in order to provide variation in the shape of the deposited layer.

4. The coating process according to claim 1, wherein there are provided two or more laser sources and the azimuthal angle for at least one of the laser sources is non-zero.

5. The coating process according to claim 1, wherein a single layer of the first material is deposited on a substrate of a second material, the first material having a different composition to the second material.

6. The coating process according to claim 1, wherein multiple layers are applied sequentially, each previously-deposited layer acting as the substrate for the layer being applied.

7. The coating process according to claim 1, wherein the first material is an anti-corrosion coating or a wear coating.

8. The coating process according to claim 1, wherein the laser is operated directly to heat the forward substrate region but not the powder beam footprint region.

9. The coating process according to claim 1, wherein the laser source is operated directly to heat the forward substrate region using a first intensity profile and to heat at least part of the powder beam footprint region using a second intensity profile, wherein the average intensity of the first intensity profile is greater than the average intensity of the second intensity profile.

10. The coating process according to claim 1, wherein the carrier gas is selected from: nitrogen and air.

11. The coating process according to claim 1, wherein the carrier gas is not heated.

12. The coating process according to claim 1, wherein the powder particles in the powder beam have average kinetic energy Ek, Ek optionally varying with position across the powder beam, and Ek is selected so that without direct heating of the forward substrate region and/or the powder footprint region, the powder particles do not adhere to the substrate, the process including the step of selectively deactivating the laser in order to prevent the powder particles from adhering to the substrate.

13. The coating process according to claim 1, wherein the deposited layer is at least 0.1 mm thick.

14. The coating process according to claim 1, the process further including the steps:
    controlling the laser and the relative movement of the powder beam and the substrate to provide a spatial temperature distribution at the powder footprint region of the substrate in which the local temperature of the substrate is in the range 0.5 Ts to less than Ts in a volume from the surface of the substrate at least up to a depth of 0.2 mm from the surface of the substrate and not more than 0.25 Ts at a depth of 1 mm from the surface of the substrate,
wherein Ts is the solidus temperature (in K) of the second material.

* * * * *